US009181396B2

(12) United States Patent
Ordonez et al.

(10) Patent No.: US 9,181,396 B2
(45) Date of Patent: Nov. 10, 2015

(54) POLYETHERIMIDES, METHODS OF MANUFACTURE, AND ARTICLES FORMED THEREFROM

(71) Applicant: SABIC Innovative Plastics IP B.V., Bergen op Zoom (NL)

(72) Inventors: Juan Justino Rodriguez Ordonez, Murcia (ES); Thomas Link Guggenheim, Mt. Vernon, IN (US); Beatriz Penalver Bernabe, Chicago, IL (US); Gregory L. Hemmer, Santa Claus, IN (US); Roy Ray Odle, Mt. Vernon, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 38 days.

(21) Appl. No.: 13/851,981

(22) Filed: Mar. 28, 2013

(65) Prior Publication Data
US 2013/0344313 A1 Dec. 26, 2013

(30) Foreign Application Priority Data

Mar. 30, 2012 (EP) ..................................... 12382118

(51) Int. Cl.
*D01F 6/74* (2006.01)
*C08G 73/10* (2006.01)
*C08L 79/08* (2006.01)
*D04H 1/46* (2012.01)

(52) U.S. Cl.
CPC ............ *C08G 73/105* (2013.01); *C08G 73/101* (2013.01); *C08G 73/1039* (2013.01); *C08G 73/1046* (2013.01); *C08L 79/08* (2013.01); *D04H 1/46* (2013.01); *Y10T 428/249921* (2013.01)

(58) Field of Classification Search
CPC ............ C08G 73/105; C08G 73/1046; C08G 73/1003; C08G 73/1067; C08G 73/1071; C08G 73/1053; C08G 73/10; C08G 73/1028; C08G 73/1021; C09D 179/08; C08L 79/08; D01F 6/74
USPC ......................................................... 428/220
See application file for complete search history.

(56) References Cited

U.S. PATENT DOCUMENTS

| | | | |
|---|---|---|---|
| 3,671,487 A | 6/1972 | Abolins | |
| 3,723,373 A | 3/1973 | Lucas | |
| 4,390,665 A * | 6/1983 | Giles, Jr. | ....................... 525/180 |
| 4,417,044 A | 11/1983 | Parekh | |
| 5,229,482 A | 7/1993 | Brunelle | |
| 5,521,230 A | 5/1996 | Bhatia et al. | |
| 5,856,421 A | 1/1999 | Schmidhauser | |
| 6,057,403 A * | 5/2000 | Sullivan et al. | ................ 525/221 |
| 6,270,853 B1 * | 8/2001 | Brown et al. | ................. 427/470 |
| 6,700,185 B1 * | 3/2004 | Kawai et al. | ................... 257/668 |
| 6,849,706 B1 | 2/2005 | Brunelle et al. | |
| 7,125,954 B2 * | 10/2006 | Guggenheim et al. | ......... 528/491 |
| 7,605,222 B2 * | 10/2009 | Ye et al. | ......................... 528/170 |
| 2006/0173158 A1 * | 8/2006 | Brunelle et al. | ............... 528/425 |
| 2007/0043203 A1 | 2/2007 | Ye et al. | |
| 2007/0149629 A1 * | 6/2007 | Donovan et al. | ............... 521/134 |
| 2008/0319161 A1 | 12/2008 | Hall | |
| 2010/0068439 A1 * | 3/2010 | Bullock et al. | ............. 428/36.92 |
| 2011/0169205 A1 * | 7/2011 | Kempf et al. | .................. 267/180 |

FOREIGN PATENT DOCUMENTS

EP 1426358 B1 1/2010

OTHER PUBLICATIONS

Extended Search Report for European Application No. 12382118.3, Application Filing Date Mar. 30, 2012, Date of Extended Search Report Aug. 24, 2012, 5 pages.
JP03-019837, Jan. 29, 1991, Abstract, 1 page.
JP03-019838, Jan. 29, 1991, Abstract, 1 page.
International Search Report for International Application No. PCT/US2013/034262, International Application Filing Date Mar. 28, 2013; Date of Mailing Jul. 18, 2013, 5 pages.
Written Opinion for International Application No. PCT/US2013/034262, International Application Filing Date Mar. 28, 2013; Date of Mailing Jul. 18, 2013, 6 pages.

\* cited by examiner

*Primary Examiner* — Aaron Austin
*Assistant Examiner* — Laura Figg
(74) *Attorney, Agent, or Firm* — Cantor Colburn LLP; Diderico van Eyl

(57) ABSTRACT

Polyetherimide compositions are described wherein the polyetherimide composition comprises a polyetherimide comprising a reacted combination of alkali metal salts comprising an alkali metal salt of a dihydroxy aromatic compound and an alkali metal salt of a monohydroxy aromatic compound with a bis(halophthalimide), wherein the alkali metal salt of the monohydroxy aromatic compound is included in an amount of greater or equal to 5 mole percent based on the total moles of the alkali metal salts, and the polyetherimide has a weight average molecular weight less than 43,000 Daltons. The polyetherimide exhibits lower levels of chlorine and chlorine end groups, lower levels of bis(halophthalimide) and bis(phthalimide), and low plate-out during manufacturing.

44 Claims, 1 Drawing Sheet

POLYETHERIMIDES, METHODS OF MANUFACTURE, AND ARTICLES FORMED THEREFROM

CROSS-REFERENCE TO RELATED APPLICATIONS

This application claims the benefit of European Patent Application No. 12382118.3, filed Mar. 30, 2012, which is incorporated by reference in its entirety herein.

BACKGROUND OF THE INVENTION

This disclosure relates to polyetherimides and compositions containing the polyetherimides, as well as their method of manufacture and articles formed from the polyetherimide compositions.

Polyetherimides ("PEIs") are amorphous, transparent, high performance polymers having a glass transition temperature ("Tg") of greater than 180° C. PEIs further have high strength, heat resistance, and modulus, and broad chemical resistance, and so are widely used in applications as diverse as automotive, telecommunication, aerospace, electrical/electronics, transportation, and healthcare.

One process for the manufacture of polyetherimides is by polymerization of alkali metal salts of dihydroxyaromatic compounds, such as bisphenol A disodium salt (BPA·Na$_2$), with a bis(halophthalimide). The molecular weight of the resulting polyetherimide can be controlled in two ways. The first is use of a molar excess of the bis(halophthalimide) relative to the alkali metal salt of the dihydroxy aromatic compound. The second is the preparation of the bis(halophthalic anhydride) in the presence of a monofunctional compound to form an end-capping agent, such as phthalic anhydride. The phthalic anhydride reacts with a portion of the organic diamine to form a monohalo-bis(phthalimide). The monohalo-bis(phthalimide) serves as an end-capping agent in the polymerization step by reaction with phenoxide end groups in the growing polymer chains.

However, these approaches can suffer from several drawbacks. Use of excess bis(halophthalimide) leads to high levels of residual unreacted bis(halophthalimide) and to high levels or chlorine end groups after completion of polymerization. Use of a monofunctional reactant such as phthalic anhydride can produce an undesirable by-product, a bis(phthalimide) having no halo functionality, which is formed by imidization of the phthalic anhydride with the organic diamine. The presence of residual bis(halophthalimide), monohalo-bis(phthalimide) and bis(phthalimide) in the polyetherimide can degrade the properties and/or performance of the polyetherimides in some applications.

Thus, there remains a need in the art for methods for controlling the molecular weight of polyetherimides, in particular methods that allow the manufacture of higher molecular weight polymers having lower levels of residuals, including residual bis(halophthalimide) and bis(phthalimide). It would be a further advantage if the process resulted in reduced levels of residual chlorine and chlorine end groups. Moreover, if would be a still further advantage if properties such as melt flow, impact strength and the like were not significantly adversely affected compared to prior art polyetherimides.

SUMMARY OF THE INVENTION

Disclosed herein is a polyetherimide composition comprising a polyetherimide comprising a reacted combination of (a) the combination of alkali metal salts comprising an alkali metal salt of a dihydroxy aromatic compound having the formula

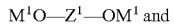

and an alkali metal salt of a monohydroxy aromatic compound having the formula

wherein $M^1$ and $M^2$ are each independently an alkali metal, and $Z^1$ and $Z^2$ are each independently an aromatic $C_{6-24}$ monocyclic or polycyclic hydrocarbyl moiety optionally substituted with 1 to 6 $C_{1-8}$ alkyl groups, 1 to 8 halogen atoms, or a combination thereof, and the alkali metal salt of the monohydroxy aromatic compound is included in an amount of greater or equal to 5 mole percent based on the total moles of the alkali metal salts; with (b) the bis(halophthalimide) having the formula

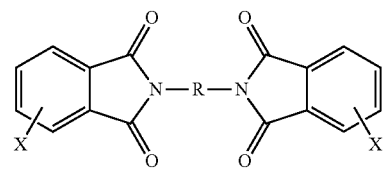

wherein R is selected from an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, an aromatic hydrocarbyl moiety having 1 to 6 aromatic groups, and a divalent group having the formula

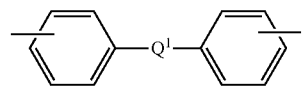

wherein $Q^1$ is selected from a direct bond, —O—, —S—, —C(O)—, —SO$_2$—, —SO—, and —C$_y$H$_{2y}$— and a halogenated derivative thereof wherein y is 1 to 5, and —(C$_6$H$_{10}$)$_z$— wherein z is an integer from 1 to 4, and; and each X is independently selected from fluoro, chloro, bromo, and iodo; and further wherein the polyetherimide has a weight average molecular weight of less than 43,000 Daltons and comprises structural units having the formula

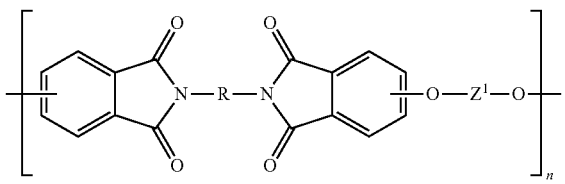

wherein n is greater than 1, and each R is the same or different, each $Z^1$ is the same or different, and are as defined above. In an embodiment a molded sample of the polyetherimide can have an unnotched Izod impact strength of less than 25 ft-lbs/in, when determined according to ASTM D4812 at 23° C., and the polyetherimide has a melt flow index of greater than 22 g/10 min, when determined according to ASTM D1238, at 337° C./6.6 kg.

Also disclosed herein is a polyetherimide composition comprising a polyetherimide comprising a reacted combination of alkali metal salts and a bis(chlorophthalimide) (a) the combination of alkali metal salts comprising an alkali metal salt of bisphenol A, and an alkali metal salt of p-cumylphenol wherein the alkali metal salt of the p-cumyl phenol is included in an amount of greater or equal to 5 mole percent, based on the total moles of the alkali metal salts; with (b) a bis(chlorophthalimide) having the formula

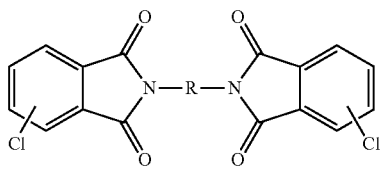

wherein R is selected from m-phenylene, p-phenylene, a diarylsulfone, and a combination thereof; and wherein the polyetherimide has a weight average molecular weight less than or equal to 43,000 Daltons and comprises structural units having the formula

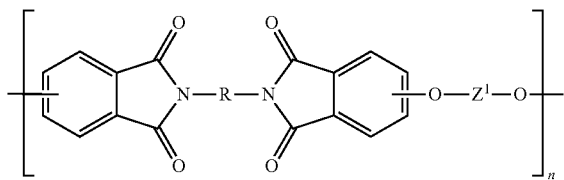

wherein n is greater than 1, and R is as defined above, a total content of residual bis(halophthalimide) and residual bis(phthalimide) in the polyetherimide composition is less than 0.05 weight percent, based on the total weight of the composition, a total content of residual bis(chlorophthalimide) is less than 600 ppm, based on the total weight of the composition, and a content of chloride is less than 3000 ppm, based on the total weight of the composition. A molded sample of the polyetherimide can have an unnotched Izod impact strength of less than 25 ft-lbs/in, when determined according to ASTM D4812 at 23° C., Also disclosed herein is a method for the manufacture of a polyetherimide, the method comprising (a) contacting a halonphthalic anhydride having the formula

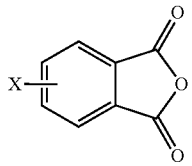

with an organic diamine having the formula

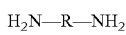

$H_2N—R—NH_2$ to form a bis(halophthalimide) having the formula

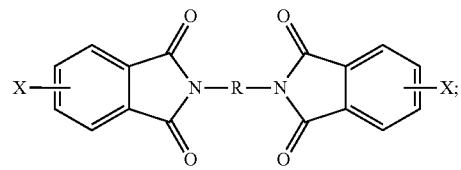

and (b) contacting the bis(halophthalimide) with a combination of alkali metal salts comprising an alkali metal salt of a dihydroxy aromatic compound having the formula $M^1O—Z^1—OM^1$, and an alkali metal salt of a monohydroxy aromatic compound having the formula $M^2O—Z^2$ wherein the alkali metal salt of the monohydroxy aromatic compound is included in an amount of greater or equal to 5 mole percent, based on the total moles of the alkali metal salt of the dihydroxy aromatic compound and the alkali metal salt of the monohydroxy aromatic compound, to form the polyetherimide comprising structural units having the formula

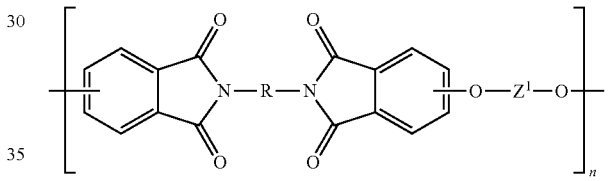

wherein in the foregoing formulas, n is greater than 1 each X is independently selected from fluoro, chloro, bromo, and iodo, R is selected from an aromatic hydrocarbon group having 6 to 20 carbon atoms, a halogenated derivative thereof, a straight or branched chain alkylene group having 2 to 10 carbon atoms, a cycloalkylene group having 3 to 20 carbon atoms, a divalent group having the formula

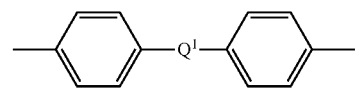

wherein $Q^1$ is selected from a bond, —O—, —S—, —C(O)—, —SO$_2$—, —SO—, and —C$_y$H$_{2y}$— and a halogenated derivative thereof wherein y is 1 to 5, and —(C$_6$H$_{10}$)$_z$— wherein z is an integer from 1 to 4, and an aromatic hydrocarbyl moiety having from 1 to 6 aromatic groups; and $M^1$ and $M^2$ are each independently an alkali metal, and $Z^1$ and $Z^2$ are each independently an aromatic $C_{6-24}$ monocyclic or polycyclic moiety optionally substituted with 1 to 6 $C_{1-8}$ alkyl groups, 1 to 8 halogen atoms, or a combination thereof, and wherein the polyetherimide has a weight average molecular weight less than 43,000 Daltons. In an embodiment a molded sample of the polyetherimide can have an unnotched Izod impact strength of less than 25 ft-lbs/in, when determined according to ASTM D4812 at 23° C., and the polyetherimide has a melt flow index of greater than 22 g/10 min, when determined according to ASTM D1238, at 337° C./6.6 kg.

Articles comprising the above polyetherimides are also disclosed.

A method of forming the above articles comprises shaping, extruding, molding, spinning, or thermoforming the above polyetherimide to form the articles, is also disclosed.

The invention is further illustrated by the Drawings, Detailed Description, Examples, and appended Claims.

DETAILED DESCRIPTION OF THE INVENTION

Figure 1:
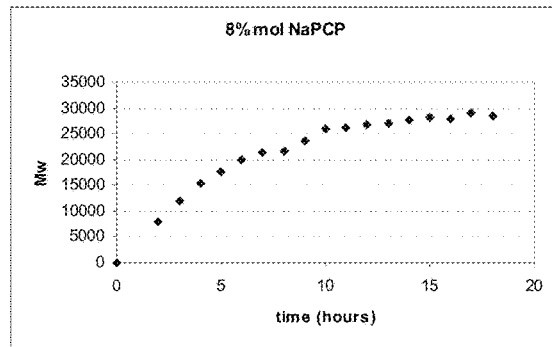
FIG. 1 shows the molecular weight build over time for a reaction conducted in the presence of 8 mole % of endcapping agent (Example 21).
Figure 2:
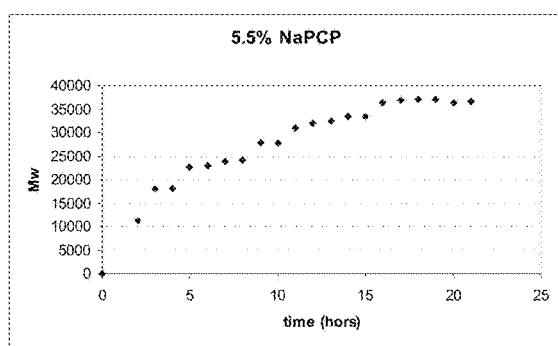
FIG. 2 shows the molecular weight build over time for a reaction conducted in the presence of 5.5 mole % of endcapping agent (Example 22).
Figure 3:
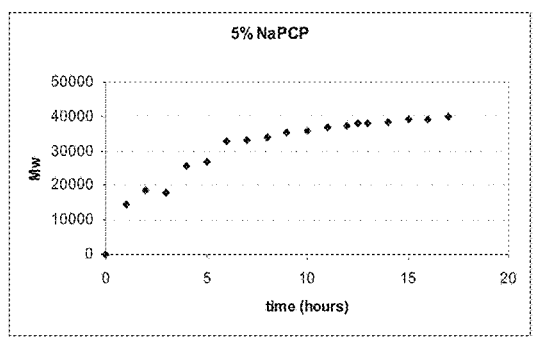
FIG. 3 shows the molecular weight build over time for a reaction conducted in the presence of 5 mole % of endcapping agent (Example 23).

The present inventors have discovered a method for the manufacture of higher molecular weight of polyetherimides having reduced residual contents, in particular lower levels of bis(halophthalimide) and bis(phthalimide). Lower levels of chlorine and chlorine end groups can also be attained. The method includes polymerizing the bis(halophthalimide) and the metal salt of the dihydroxy aromatic compound in the presence of greater or equal to 5 mole percent of a metal salt of an aromatic monohydroxy compound. The process is efficient and readily adapted to current manufacturing methods and equipment. The polyetherimides obtained using these processes have excellent properties, including melt flow and impact strength. In a particularly advantageous feature, the polyetherimides have low plate-out during manufacturing, as described in further detail below.

Other than in the operating examples or where otherwise indicated, all numbers or expressions referring to quantities of ingredients, reaction conditions, and the like, used in the specification and Claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same component or property are inclusive of the endpoint and independently combinable.

All molecular weights in this application refer to weight average molecular weights unless indicated otherwise. All such mentioned molecular weights are expressed in Daltons.

The terms "a" and "an" do not denote a limitation of quantity, but rather denote the presence of at least one of the referenced item. "Or" means "and/or." As used herein, "combination thereof" is inclusive of one or more of the recited elements, optionally together with a like element not recited. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) can be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "alkyl" includes both $C_{1-30}$ branched and straight chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl. The term "aryl" means an aromatic moiety containing the specified number of carbon atoms, such as to phenyl, tropone, indanyl, or naphthyl.

All ASTM tests are based on the 2003 edition of the Annual Book of ASTM Standards unless otherwise indicated.

The polyetherimides are of formula (1)

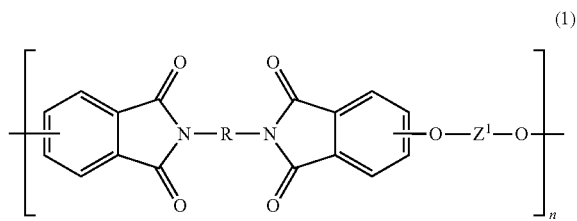

(1)

wherein n is greater than 1, for example 10 to 1,000 or more, or more specifically 10 to 500.

The group R in formula (1) is a $C_{6-27}$ aromatic hydrocarbon group or a halogenated derivative thereof, a straight or branched chain $C_{2-10}$ alkylene group or a halogenated derivative thereof, a $C_{3-20}$ cycloalkylene group or a halogenated derivative thereof, an aromatic hydrocarbyl moiety having from 1 to 6 aromatic groups, —$(C_6H_{10})_z$— wherein z is an integer from 1 to 4, or a divalent group of formula (2)

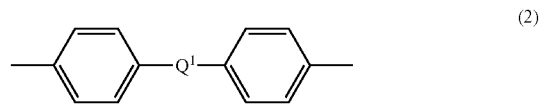

(2)

wherein $Q^1$ is a single bond, —O—, —S—, —C(O)—, —$SO_2$—, —SO—, —$C_yH_{2y}$— and a halogenated derivative thereof wherein y is an integer from 1 to 5, including perfluoroalkylene groups, —$(C_6H_{10})_z$— wherein z is an integer from 1 to 4. In an embodiment, R is a divalent group of formulas (3)

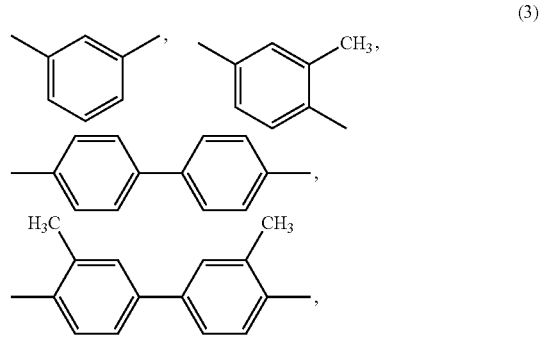

(3)

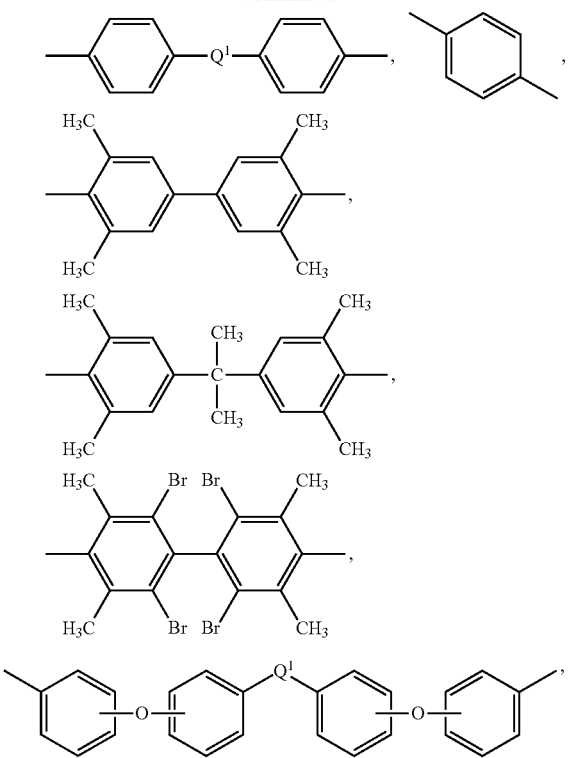

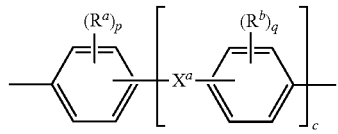

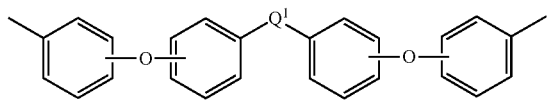

wherein $Q^1$ is —O—, —S—, —C(O)—, —SO$_2$—, —SO—, —C$_y$H$_{2y}$— wherein y is an integer from 1 to 5 or a halogenated derivative thereof, including perfluoroalkylene groups, or —(C$_6$H$_{10}$)$_z$— wherein z is an integer from 1 to 4. In some embodiments, R is the diether aromatic moiety having four phenylene groups wherein Q is a direct bond, —O—, —S—, —C(O)—, —SO$_2$—, —SO—, —C$_y$H$_{2y}$— and a halogenated derivative thereof wherein y is an integer from 1 to 5, or —(C$_6$H$_{10}$)$_z$— wherein z is an integer from 1 to 4. In some embodiments, R is m-phenylene, p-phenylene, or a diarylsulfone. The diarylsulfone can be, for example, 4,4'-diphenylsulfone. Embodiments where R is a divalent arylene ether can also be specifically mentioned, for example an arylene ether of the formula

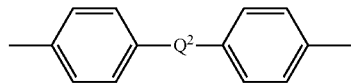

(3a)

wherein $Q^1$ is selected from a direct bond, —O—, —S—, —C(O)—, —SO$_2$—, —SO—, —C$_y$H$_{2y}$— and a halogenated derivative thereof wherein y is an integer from 1 to 5, and —(C$_6$H$_{10}$)$_z$— wherein z is an integer from 1 to 4. In an embodiment, $Q^1$ in formula (3a) is —O—.

The group $Z^1$ in formula (1) is a substituted or unsubstituted divalent organic group, and can be an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded. Exemplary groups $Z^1$ include groups of formula (4)

(4)

wherein $R^a$ and $R^b$ are each independently a halogen atom or a monovalent hydrocarbon group; p and q are each independently integers of 0 to 4; c is zero to 4; and $X^a$ is a bridging group connecting the two hydroxy-substituted aromatic groups, where the bridging group and the hydroxy substituent of each C$_6$ arylene group are disposed ortho, meta, or para (specifically para) to each other on the C$_6$ arylene group. The bridging group $X^a$ can be a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group $Z^1$ is a divalent group of formula (4a)

(4a)

wherein $Q^2$ is —O—, —S—, —C(O)—, —SO$_2$—, —SO—, —C$_y$H$_{2y}$— wherein y is an integer from 1 to 5 and halogenated derivatives thereof, including perfluoroalkylene groups. In a specific embodiment Q is 2,2-isopropylidene.

In another specific embodiment, the polyetherimide comprises more than 1, specifically 10 to 1,000, or more specifically, 10 to 500 structural units, of formula (1) wherein R is a divalent group of formulas (3) wherein $Q^1$ is —C$_y$H$_{2y}$— wherein y is an integer from 1 to 5 or a halogenated derivative thereof, and Z is a group of formula (4a). In a specific embodiment, R is m-phenylene, p-arylene diphenylsulfone, or a combination thereof, and $Z^1$ is 2,2-(4-phenylene)isopropylidene. An example of a polyetherimide sulfone comprises structural units of formula (1) wherein at least 50 mole percent of the R groups are of formula (2) wherein Q is —SO$_2$— and the remaining R groups are independently p-phenylene or m-phenylene or a combination comprising at least one of the foregoing; and $Z^1$ is 2,2-(4-phenylene)isopropylidene.

The polyetherimides can optionally comprise additional structural imide units, for example imide units of formula (5)

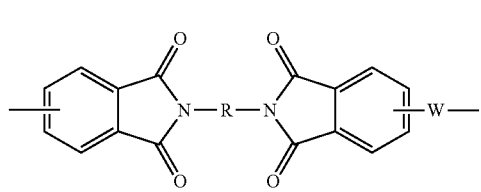

(5)

wherein R is as described in formula (1) and W is a linker of formulas (6).

(6)

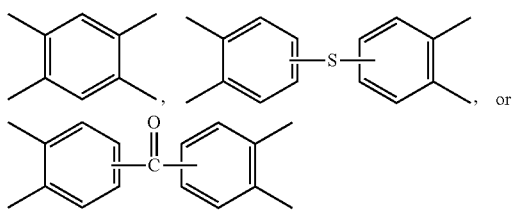

These additional structural imide units can be present in amounts ranging from 0 to 10 mole % of the total number of units, specifically 0 to 5 mole %, more specifically 0 to 2 mole %. In an embodiment no additional imide units are present in the polyetherimides.

The polyetherimides are prepared by the so-called "halo-displacement" or "chloro-displacement" method. In this method, a halophthalic anhydride of formula (7)

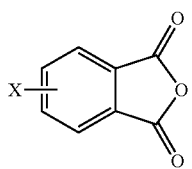
(7)

wherein X is a halogen, is condensed (imidized) with an organic diamine of the formula (8)

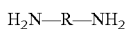
(8)

wherein R is as described in formula (1), to form a bis(halophthalimide) of formula (9).

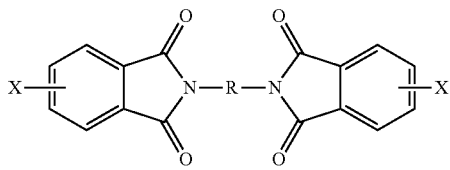
(9)

In an embodiment, X is a halogen, specifically fluoro, chloro, bromo, or iodo, more specifically chloro. A combination of different halogens can be used.

Illustrative examples of amine compounds of formula (8) include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis (p-b-amino-t-butylphenyl)ether, bis(p-b-methyl-o-aminophenyl) benzene, bis(p-b-methyl-o-aminopentyl) benzene, 1,3-diamino-4-isopropylbenzene, bis(4-aminophenyl) ether and 1,3-bis(3-aminopropyl) tetramethyldisiloxane. Mixtures of these amines can be used. Illustrative examples of amine compounds of formula (8) containing sulfone groups include diamino diphenyl sulfone (DDS) and bis(aminophenoxy phenyl) sulfones (BAPS). Combinations comprising any of the foregoing amines can be used.

Specifically, diamine (8) is a meta-phenylene diamine (8a) or a para-phenylene diamine (8b)

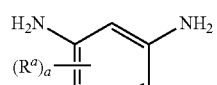
(8a)

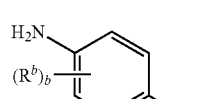
(8b)

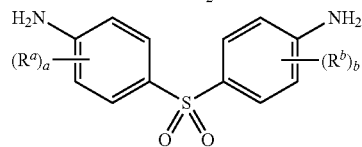

wherein $R^a$ and $R^b$ are each independently a halogen atom, nitro, cyano, $C_2$-$C_{20}$ aliphatic group, $C_2$-$C_{40}$ aromatic group, and a and b are each independently 0 to 4. Specific examples include meta-phenylenediamine (mDA), para-phenylenediamine (pDA), 2,4-diaminotoluene, 2,6-diaminotoluene, 2-methyl-4,6-diethyl-1,3-phenylenediamine, 5-methyl-4,6-diethyl-1,3-phenylenediamine, 1,3-diamino-4-isopropylbenzene, and 4,4'-diamino diphenyl sulfone. In some embodiments, diamine (8) is selected from meta-phenylene diamine, para-phenylene diamine, 4,4'-diamino diphenyl sulfone, and a combination thereof.

Condensation of halophthalic anhydride (7) and diamine (8) (imidization) can be conducted in the absence or presence of a catalyst. Exemplary phase transfer catalysts for imidization include sodium phenyl phosphinate (SPP), acetic acid, benzoic acid, phthalic acid, or substituted derivatives thereof. In an embodiment, sodium phenyl phosphinate is used as the imidization catalyst. Catalyst, if used, is present in an amount effective to accelerate the reaction, for example 0.1-0.3 weight percent (wt %) based on the weight of diamine.

The reaction is generally conducted in the presence of a relatively non-polar solvent, preferably with a boiling point above 100° C., specifically above 150° C., for example o-dichlorobenzene, dichlorotoluene, 1,2,4-trichlorobenzene, diphenyl sulfone, a monoalkoxybenzene such as anisole, veratrole, diphenylether, or phenetole. Ortho-dichlorobenzene and anisole can be particularly mentioned.

The bis(halophthalimide)s (9) are generally prepared at least 110° C., specifically 150° to 275° C., more specifically 175 to 225° C. At temperatures below 110° C., reaction rates may be too slow for economical operation. Atmospheric or super-atmospheric pressures can be used, for example up to 5 atmospheres, to facilitate the use of high temperatures without causing solvent to be lost by evaporation.

The solvent, diamine (8), and halophthalic anhydride (7) can be combined in amounts such that the total solids content during the reaction to form bis(halophthalimide) (8) does not exceed 25 wt %, or 17 wt %. "Total solids content" expresses the proportion of the reactants as a percentage of the total weight including liquids present in the reaction at any given time.

A molar ratio of halophthalic anhydride (7) to diamine (8) of 1.98:1 to 2.04:1, specifically 2:1 is used. While other ratios may be employed, a slight excess of anhydride or diamine may be desirable. A proper stoichiometric balance between halophthalic anhydride (7) and diamine (8) is maintained to prevent undesirable by-products that can limit the molecular weight of the polymer, and/or result in polymers with amine end groups. Accordingly, in an embodiment, imidization proceeds adding diamine (8) to a mixture of halophthalic anhydride (7) and solvent to form a reaction mixture having a targeted initial molar ratio of halophthalic anhydride to diamine; heating the reaction mixture to a temperature of at least 100° C. (optionally in the presence of an imidization catalyst); analyzing the molar ratio of the heated reaction mixture to determine the actual initial molar ratio of halophthalic anhydride (7) to diamine (8); and, if necessary, adding halophthalic anhydride (7) or diamine (8) to the analyzed reaction mixture to adjust the molar ratio of halophthalic anhydride (7) to diamine (8) to 2.01 to 2.3.

After imidization, the bis(halophthalimide) (8) is polymerized by reaction with an alkali metal salt of a dihydroxy aromatic compound to provide the polyetherimide (1). In particular, the halogen group X of bis(halophthalimide) (9)

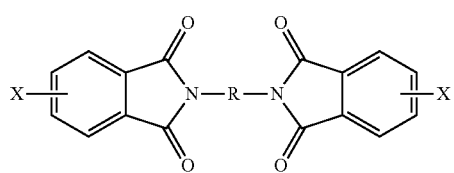
(9)

is displaced by reaction with an alkali metal salt of a dihydroxy aromatic compound of formula (10)

$$M^1O—Z^1—OM^1 \quad (10)$$

wherein $M^1$ is an alkali metal and $Z^1$ is as described in formula (1), to provide the polyetherimide of formula (1)

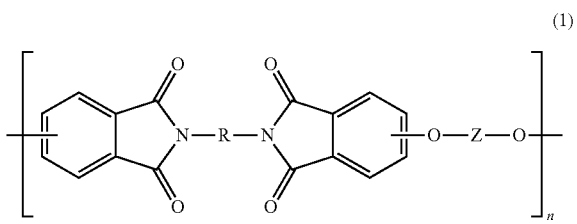
(1)

wherein n, R, and $Z^1$ are as defined above.

Alkali metal $M^1$ can each independently be any alkali metal, for example lithium, sodium, potassium, and cesium, and can be the same as $M^2$. Thus alkali metal salt (10) is selected from lithium salts, sodium salts, potassium salts, cesium salts, and a combination thereof. Specific metals are potassium or sodium. In some embodiments, M1 is sodium.

The alkali metal salt (10) can be obtained by reaction of the metal with an aromatic dihydroxy compound of formula (4), specifically an aromatic $C_{6-24}$ monocyclic or polycyclic dihydroxy compound optionally substituted with 1 to 6 $C_{1-8}$ alkyl groups, 1 to 8 halogen atoms, or a combination thereof, for example a bisphenol compound of formula (11):

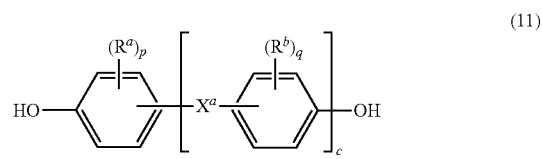
(11)

wherein $R^a$, $R^b$, and $X^a$ are as described in formula (3). In a specific embodiment the dihydroxy compound corresponding to formulas (4a) can be used. The compound 2,2-bis(4-hydroxyphenyl) propane ("bisphenol A" or "BPA") can be used.

The polymerization is conducted in the presence of an alkali metal salt of a monohydroxy aromatic compound of formula (12)

$$M^2O—Z^2 \quad (12)$$

wherein $M^2$ is an alkali metal and $Z^2$ is a monohydroxy aromatic compound. It has been found by the inventors hereof that when the amount of the monohydroxy aromatic salt (12) is greater or equal to 5 mole percent, based on the total moles of the alkali metal salts (10) and (12), a polyetherimide having a weight average molecular weight from more than 200 to less than 43,000 Daltons can be obtained as further described below.

Further, as described in more detail below, the polyetherimides can have low residual contents and good physical properties. The amount of monohydroxy aromatic salt (12) can also be from greater than or equal to 6 to 15 mole percent, or from greater than or equal to 6 to 10 mole percent, based on the total moles of the alkali metal salts (10) and (12). For example, the amount of monohydroxy aromatic salt (12) can be greater than or equal to 5 mole percent to 15, 14, 13, 12, 11, 10, 9, 8, or 7 mole percent.

Alkali metal $M^2$ can be any alkali metal, for example lithium, sodium, potassium, and cerium, and is generally the same as the alkali metal $M^1$. Thus alkali metal salt (12) is selected from lithium salts, sodium salts, potassium salts, cesium salts, and a combination thereof. Specific metals are potassium or sodium. In some embodiments, $M^2$ is sodium. The alkali metal salt (12) can be obtained by reaction of the metal $M^2$ with aromatic $C_{6-24}$ monocyclic or polycyclic monohydroxy compound optionally substituted with 1 to 6 $C_{1-8}$ alkyl groups, 1 to 8 halogen atoms, or a combination thereof, for example a monohydroxy aromatic compound formula (13)

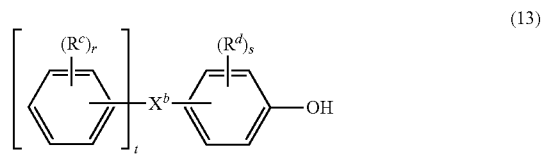
(13)

wherein $R^c$ and $R^d$ are each independently a halogen atom or a monovalent hydrocarbon group; r and s are each independently integers of 0 to 4; c is zero to 4; t is 0 or 1; when t is zero, $X^b$ is hydrogen or a $C_{1-18}$ alkyl group; and when t is 1, $X^b$ is a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic bridging group can be disposed such that the C$_6$ arylene groups connected thereto are each connected to a common alkylidene carbon or to different carbons of the C$_{1-18}$ organic bridging group. In some embodiments t is zero and X$^b$ is hydrogen or a C$_{4-12}$ alkyl group or t is one and X$^b$ is a single bond or a C$_{1-9}$ alkylene group.

In an embodiment Z$^2$ is a group of formulas

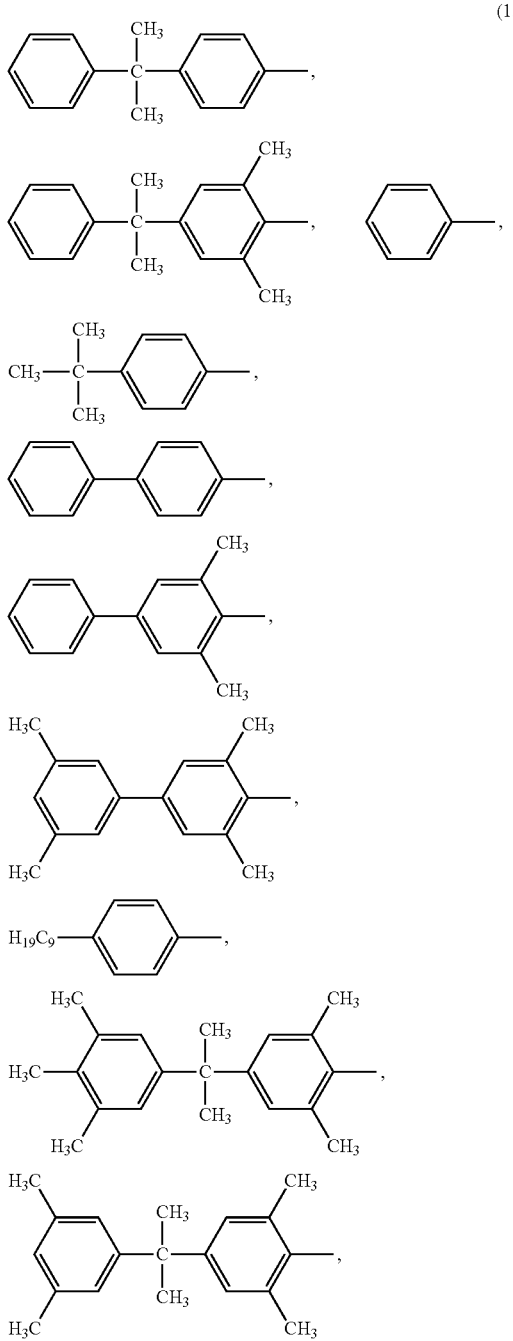
(13a)

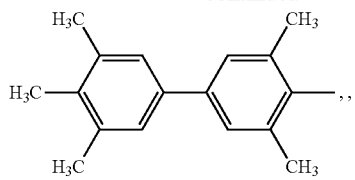

and a combination thereof.

In some embodiments, Z$^1$ and Z$^2$ are each independently a C$_{12-24}$ polycyclic hydrocarbyl moiety optionally substituted with 1 to 6 C$_{1-8}$ alkyl groups. In some embodiments, M$^1$ and M$^2$ are each sodium. For example, in some embodiments, Z$^1$ is a divalent group having formula

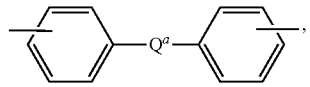

and

Z$^2$ is a monovalent group having formula

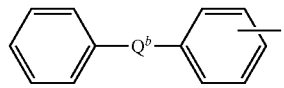

wherein Q$^a$ and Q$^b$ are each independently selected from a single bond, —O—, —S—, —C(O), —SO$_2$, —SO—, —C$_y$H$_{2y}$— wherein y is an integer from 1 to 5, —(C$_6$H$_{10}$)$_z$— wherein z is an integer from 1 to 4; and a halogenated derivative thereof; and R is selected from a divalent group having the formula

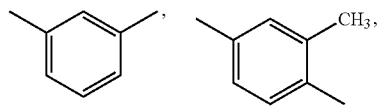

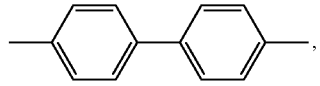

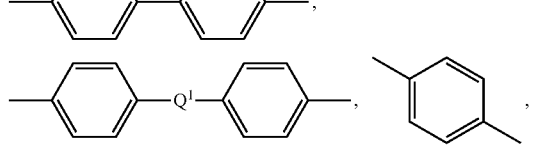

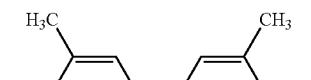

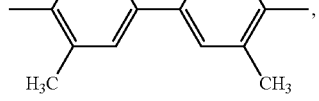

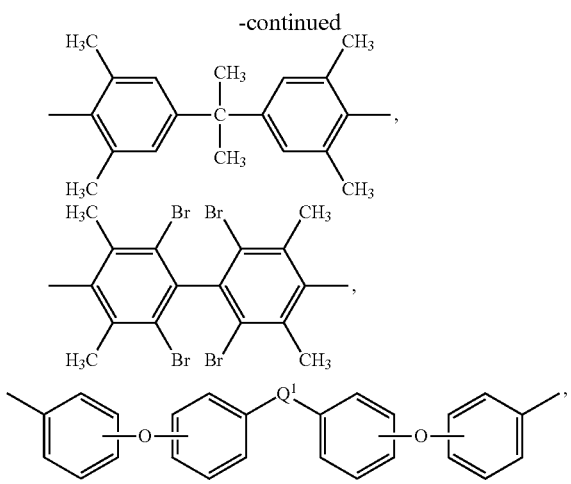

and a combination thereof, wherein Q is selected from a single bond, —O—, —S—, —C(O)—, —SO$_2$—, —SO—, —C$_y$H$_{2y}$— and a halogenated derivative thereof wherein y is an integer from 1 to 5, and —(C$_6$H$_{10}$)$_z$— wherein z is an integer from 1 to 4.

Polymerization by reaction of bis(halophthalimide) (9) with a combination of alkali metal salts (10) and (12) can be in the presence or absence of phase transfer catalyst that is substantially stable under the reaction conditions used, in particular temperature. Exemplary phase transfer catalysts for polymerization include hexaalkylguanidinium and α,ω-bis(pentaalkylguanidinium)alkane salts. Both types of salts can be referred to herein as "guanidinium salts."

Polymerization is generally conducted in the presence of a relatively non-polar solvent, preferably with a boiling point above 100° C., specifically above 150° C., for example o-dichlorobenzene, dichlorotoluene, 1,2,4-trichlorobenzene, diphenyl sulfone, a monoalkoxybenzene such as anisole, veratrole, diphenylether, or phenetole. Ortho-dichlorobenzene and anisole can be particularly mentioned. Alternatively, a polar aprotic solvent can be used, illustrative examples of which include dimethylformamide (DMF), dimethylacetamide (DMAc), dimethylsulfoxide (DMSO), and N-methylpyrrolidinone (NMP).

Polymerization can be conducted at least 110° C., specifically 150° to 275° C., more specifically 175° to 225° C. At temperatures below 110° C., reaction rates may be too slow for economical operation. Atmospheric or super-atmospheric pressures can be used, for example up to 5 atmospheres, to facilitate the use of high temperatures without causing solvent to be lost by evaporation.

In an embodiment, the combination of alkali metal salts (10) and (12) is added to the organic solvent and the water is removed from the mixture, for example as its azeotrope. The bis(halophthalimide) (9) is then added and water removed from the mixture, for example as its azeotrope, followed by addition of a catalyst in a pre-dried solution in organic solvent. Water removal from the system can be accomplished in either batch, semi-continuous or continuous processes using means known in the art such as a distillation column in conjunction with one or more reactors. In an embodiment, a mixture of water and non-polar organic liquid distilling from a reactor is sent to a distillation column where water is taken off overhead and solvent is recycled back into the reactor at a rate to maintain or increase the desired solids concentration. Other methods for water removal include passing the condensed distillate through a drying bed for chemical or physical adsorption of water.

The molar ratio of the bis(halophthalimide) (9) to the alkali metal salt (10) can be 1.0:0.9 to 0.9:1.0. A solids content of the bis(halophthalimide) (9) in the polymerization can be 15 to 25 wt %, based on the total weight of the polymerization mixture.

The inventors have discovered that use of the above amounts of metal alkali salt (12) provides polyetherimides having an excellent combination of properties, in particular high molecular weight, good impact strength, and excellent melt flow.

In particular, the polyetherimides have a weight average molecular weight (Mw) within the ranges described above, in particular 43,000 Daltons, or less than 40,000, or less than 35,000, or less than 32,000 Daltons. Mw can be measured by gel permeation chromatography (GPC). In an embodiment, the polyetherimide has a weight average molecular weight from more than 500 Daltons to less than 43,000 Daltons. In other embodiments, the polyetherimide has a weight average molecular weight from more than 500 Daltons, or more than 1,000 Daltons, or more than 2,000 Daltons, or more than 5,000 Daltons, or more than 10,000 Daltons, to a weight average molecular weight that is less than 43,000 Daltons, 42,000 Daltons, 41,000 Daltons, 40,000 Daltons, 39,000 Daltons, 38,000 Daltons, 37,000 Daltons, 36,000 Daltons, 35,000 Daltons, 34,000 Daltons, 33,000 Daltons, 32,000 Daltons, 31,000 Daltons, 30,000 Daltons, 29,000 Daltons, 28,000 Daltons, 27,000 Daltons, 26,000 Daltons, 25,000 Daltons, 24,000 Daltons, 23,000 Daltons, 22,00 Daltons, 21,000 Daltons, or 20,000 Daltons. All combinations comprising the foregoing are specifically contemplated, for example 1,000 to less than 43,000 Daltons, or 1,000 to 40,000 Daltons, or 2,000 to less than 43,000 Daltons, or 2,000 to 40,000 Daltons. In some embodiments the Mw can be 5,000 or 10,000 to less than 43,000 Daltons.

The polyetherimides further have a melt flow index of greater than 22 grams per 10 minute (g/10 min), as measured by American Society for Testing Materials (ASTM) D 1238 at 337° C., using a 6.7 kilogram (kg) weight. For example the melt flow index can be 22 to 60 g/10 min, when determined according to ASTM D1238, at 337° C./6.6 kg. In other embodiments, our polyetherimides have a melt flow index of greater than 22 g/10 min as measured by ASTM D 1238 at 337° C., using a 6.7 kilogram (kg) weight) to 1500 g/10 min, 1400 g/10 min, 1300 g/10 min, 1200 g/10 min, 1100 g/10 min, 1000 g/10 min, 900 g/10 min, 800 g/10 min, 700 g/10 min, 600 g/10 min, 500 g/10 min, 400 g/10 min, 300 g/10 min, 200 g/10 min, or 100 g/10 min, 50 g/10 min.

The polyetherimides also have good impact strength, in particular an unnotched Izod impact strength of less than 25 ft-lbs/in, when determined according to ASTM D4812 at 23° C. In other embodiments, the polyetherimides shave an unnotched Izod impact strength when determined according to ASTM D4812 at 23° C. from more than 0 to a less than 25 ft-lbs/in, less than or equal to 24 ft-lbs/in, less than or equal to 23 ft-lbs/in, less than or equal to 22 ft-lbs/in, less than or equal to 21 ft-lbs/in, less than or equal to 20 ft-lbs/in, less than or equal to 19 ft-lbs/in, less than or equal to 18 ft-lbs/in, less than or equal to 17 ft-lbs/in, less than or equal to 16 ft-lbs/in, less than or equal to 15 ft-lbs/in, less than or equal to 14 ft-lbs/in, less than or equal to 13 ft-lbs/in, less than or equal to 12 ft-lbs/in, less than or equal to 11 ft-lbs/in, less than or equal to 10 ft-lbs/in, less than or equal to 9 ft-lbs/in, less than or equal to 8 ft-lbs/in, less than or equal to 7 ft-lbs/in, or less than or equal to 6 ft-lbs/in. In other embodiments, the polyetherimides shave an unnotched Izod impact strength when determined according to ASTM D4812 at 23° C. from more than 5 to less than 25 ft-lbs/in, less than or equal to 24 ft-lbs/in, less than or equal to 23 ft-lbs/in, less than or equal to 22 ft-lbs/in, less than or equal to 21 ft-lbs/in, less than or equal to 20 ft-lbs/in, less than or equal to 19 ft-lbs/in, less than or equal to 18 ft-lbs/in, less than or equal to 17 ft-lbs/in, less than or equal to 16 ft-lbs/in, less than or equal to 15 ft-lbs/in, less than or equal to 14 ft-lbs/in, less than or equal to 13 ft-lbs/in, less than or equal to 12 ft-lbs/in, less than or equal to 11 ft-lbs/in, less than or equal to 10 ft-lbs/in, less than or equal to 9 ft-lbs/in, less than or equal to 8 ft-lbs/in, less than or equal to 7 ft-lbs/in, or less than or equal to 6 ft-lbs/in.

The polyimides can also have a glass transition temperature of greater than 180° C., specifically of 200° C. to 500° C., as measured using differential scanning calorimetry (DSC) per ASTM test D3418. In some embodiments the polyimide, an in particular a polyetherimide has a glass transition temperature of 240° to 350° C.

In a further unexpected feature, the polyetherimides have reduced levels of residuals, in particular residual bis(halophthalimide) and residual bis(phthalimide). The presence of such residuals can reduce the Tg of the polyetherimide, reduce impact strength, reduce flow, or adversely affect other properties of the polyetherimides, such as colorlessness, or reduce the glossiness of an article made from the polyetherimide.

Thus, the polyetherimides can have a total content of residual bis(halophthalimide) and residual bis(phthalimide) of less than 0.05 wt %, less than 0.04 wt %, less than 0.03 wt %, less than 0.02 wt %, or less than 0.01 wt %, based on the total weight of the polyetherimide.

In addition, or in the alternative, the polyetherimides can have a total content of residual bis(halophthalimide) of less than 600 parts per million by weight (ppm), less than 500 ppm, less than 400 ppm, or less than 300 ppm, based on the total weight of the polyetherimide.

In addition, or in the alternative, the polyetherimides can have a content of chloride of less than 3000 ppm, less than 2500 ppm, less than 2000 ppm, or less than 1000 ppm, based on the total weight of the composition.

In addition, or in the alternative, the polyetherimides can have from 0.5 to 4 weight percent of a monohydroxy aromatic compound substituent, i.e., a residue of the monohydroxy aromatic compound, based on the total weight of the polyetherimide. The substituent forms the terminal group of the polyetherimides.

In a further advantage, the polyetherimides have low plate-out during molding, which is results in more efficient manufacturing, and improvements in articles made from the polyetherimides. Without being bound by theory, higher levels of residuals results in an undesirable phenomenon called "plate-out" during molding. In plate-out, low molecular weight compounds migrate out of the polyetherimide and are deposited on the mold surface during molding. Such deposits must be cleaned from the mold, interrupting the manufacturing process. The deposits also mar the surface appearance of the molded article. Plate-out is especially undesirable when smooth, glossy surfaces are desirable, for example when the surface is going to be metallized to form a smooth mirror finish.

Thus, in an embodiment, the polyetherimide has a plate-out weight of less than 1.1 mg, when determined using 200 shots from a 100° F. (37.8° C.) mold having the dimensions of 5×6×0.16 inches (12.7×15.2×0.4 cm). Alternatively, or in addition, the polyetherimide can have a plate-out weight of less than 1.1 mg, when determined using 200 shots from a 350° F. (177° C.) Dynatup having the dimensions 4 inches (101.6 mm) in diameter and 0.125 inches (3.175 mm) thick.

The polyetherimides can be formulated to provide a wide variety of polyetherimide compositions for the manufacture of articles. The polyetherimide compositions can further optionally comprise a filler, including a reinforcing filler, a particulate filler, a nanofiller, or a combination thereof. The filler can be a reinforcing filler, for example a flat, plate-like, and/or fibrous filler. Typically, the flat, plate-like filler has a length and width at least ten times greater than its thickness, where the thickness is from 1 to 1000 micrometers. Exemplary reinforcing fillers of this type include glass flakes, mica, flaked silicon carbide, aluminum diboride, aluminum flakes, and steel flakes; wollastonite including surface-treated wollastonite; calcium carbonate including chalk, limestone, marble and synthetic, precipitated calcium carbonates, generally in the form of a ground particulates; talc, including fibrous, modular, needle shaped, and lamellar talc; kaolin, including hard, soft, calcined kaolin, and kaolin comprising various coatings known in the art to facilitate compatibility with the polymeric matrix polymer; mica; and feldspar.

Exemplary reinforcing fillers also include fibrous fillers such as short inorganic fibers, natural mineral fibrous fillers, single crystal fibers, glass fibers, ceramic fibers and organic reinforcing fibrous fillers. Short inorganic fibers include borosilicate glass, carbon fibers, and those derived from blends comprising at least one of aluminum silicates, aluminum oxides, magnesium oxides, and calcium sulfate hemihydrate. Single crystal fibers or "whiskers" include silicon carbide, alumina, boron carbide, iron, nickel, and copper single crystal fibers. Glass fibers, including glass fibers such as E, ECR, S, and NE glasses and quartz, and the like can also be used.

Such reinforcing fillers can be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture. Typical cowoven structures include glass fiber-carbon fiber, carbon fiber-aromatic polyimide (aramid) fiber, and aromatic polyimide fiber-glass fiber. Fibrous fillers can be supplied in the form of, for example, rovings, woven fibrous reinforcements, such as 0-90 degree fabrics, non-woven fibrous reinforcements such as continuous strand mat, chopped strand mat, tissues, papers and felts and 3-dimensionally woven reinforcements, performs and braids.

The reinforcing fibers can have a diameter of 5 to 25 micrometers, specifically diameters of 9 to 15 micrometers. In preparing molding compositions it is convenient to use reinforcing fibers such as fiberglass in the form of chopped strands of from 3 millimeters to 15 millimeters long. In articles molded from these compositions, on the other hand, shorter lengths will typically be encountered because during compounding considerable fragmentation can occur. Combinations of rigid fibrous fillers with flat, plate-like fillers can be used, for example to reduce warp of a molded article.

In some applications it can be desirable to treat the surface of the filler with a chemical coupling agent to improve adhesion to a thermoplastic polymer in the composition. Examples of useful coupling agents are alkoxy silanes and alkoxy zirconates Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The amount of reinforcing filler used in the polyetherimide composition can vary widely, and is that amount effective to provide the desired physical properties and flame resistance.

In some instances the reinforcing filler is present in an amount from more than 10 to 60 wt %, more specifically 15 to 40 wt %, and even more specifically 20 to 35 wt % each based on the total weight of the composition. In an embodiment no or substantially no reinforcing filler is present.

The polyetherimide composition can optionally comprise one or more other types of particulate fillers. Exemplary particulate fillers include silica, such as fused silica and crystalline silica; boron-nitride and boron-silicate; alumina, and magnesium oxide (or magnesia); silicate spheres; flue dust; cenospheres; aluminosilicate (armospheres); natural silica sand; quartz; quartzite; perlite; tripoli; diatomaceous earth; synthetic silica; and a combination thereof. All of the above fillers can be surface treated with silanes to improve adhesion and dispersion with the polymeric matrix polymer. When present, the amount of additional particulate filler in the polyetherimide composition can vary widely, and is that amount effective to provide the desired physical properties and flame resistance. In some instances the particulate filler is present in an amount from 1 to 80 wt %, specifically 5 to 30 wt %, more specifically 5 to 20 wt %, each based on the total weight of the composition. Alternatively, in some embodiments, our compositions do not contain appreciable amounts of fillers and in some situations, there are no detectable amounts of fillers, i.e., fillers are substantially absent or absent from the compositions. Accordingly, in some instances, the particulate filler is present in an amount from 0 wt % to an amount that is less than or equal to an amount selected from 80 wt %, 75 wt %, 70 wt %, 65 wt %, 60 wt %, 55 wt %, 50 wt %, 45 wt %, 40 wt %, 35 wt %, 30 wt %, 25 wt %, 20, 15 wt %, 10 wt %, 5 wt %, and 1 wt %, each based on the total weight of the composition.

Nanofillers can be added for a variety of purposes, and are characterized as having an average longest dimension of 0.5 to 100 nanometers. Nanofillers can be derived from any of the above materials for reinforcing or particulate fillers, for example nanofillers comprising boehmite alumina (synthetic), calcium carbonate, ceramics, carbon black, carbon nanotubes, carbon fibers, cellulose, activated clay, natural clay (mined, refined, and treated), synthetic clay, organoclays, natural fibers, gold, graphites, kaolins, magnesium hydroxide, mica, montmorillonite clay, polyorganosilsesquioxanes (POSS), silica, silver, talc, organotitanates, titania, wollastonite, zinc oxide, organozirconates, and zirconia. A combination of the foregoing can be used. In some instances the nano filler is present in an amount from 0.1 to 50 wt %, specifically 1 to 30 wt %, more specifically 1 to 20 wt %, each based on the total weight of the composition. Alternatively, in some embodiments, our compositions do not contain appreciable amounts of nanofillers and in some situations, there are no detectable amounts of fillers, i.e., fillers are substantially absent or absent from the compositions. Accordingly, in some instances, the nanofiller is present in an amount from 0 wt % to an amount that is less than or equal 50 wt %, 45 wt %, 40 wt %, 35 wt %, 30 wt %, 25 wt %, 20, 15 wt %, 10 wt %, 5 wt %, and 1 wt %, each based on the total weight of the composition.

The polyetherimide compositions can include various additives ordinarily incorporated into polymer compositions of this type, with the proviso that the additives are selected so as to not significantly adversely affect the desired properties of the composition. Exemplary additives include catalysts, impact modifiers, fillers, antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame retardants, anti-drip agents, and radiation stabilizers. Combinations of additives can be used, for example a combination of a heat stabilizer, a mold release agent, and optionally an ultraviolet light stabilizer. In general, the additives are used in the amounts generally known to be effective. The foregoing additives (except any fillers) are generally present in an amount from 0.005 to 20 wt %, specifically 0.01 to 10 wt %, based on the total weight of the composition. Alternatively, in some embodiments, our compositions do not contain appreciable amounts of additives, and in some situations, there are no detectable amounts of additives, i.e., additives are substantially absent or absent from the compositions. Accordingly, the foregoing additives (except any fillers) can be present in an amount from 0 to less than or equal to an amount selected from 20 wt %, 19 wt % 18 wt %, 17 wt %, 16 wt %, 15 wt %, 14 wt %, 13 wt %, 12 wt %, 11 wt %, 10 wt %, 9 wt %, 8 wt %, 7 wt %, 6 wt %, 5 wt %, 4 wt %, 3 wt %, 2 wt %, 1 wt %, and 0.0001 wt %, based on the total weight of the composition. In another embodiment, no appreciable amount of any additive other than a heat stabilizer, a mold release agent, and optionally an ultraviolet light stabilizer is present in the compositions. In still another embodiment, no detectable amount of any additive other than a heat stabilizer, a mold release agent, and optionally an ultraviolet light stabilizer is present in the compositions.

Suitable antioxidants can be compounds such as phosphites, phosphonites and hindered phenols or mixtures thereof. Phosphorus-containing stabilizers including triaryl phosphites and aryl phosphonates are useful additives. Difunctional phosphorus containing compounds can also be unseeded. Preferred stabilizers can have a molecular weight greater than or equal to 300. Some exemplary compounds are tris-di-tert-butylphenyl phosphite available from Ciba Chemical Co. as IRGAFOS 168 and bis(2,4-dicumylphenyl) pentaerythritol diphosphite available commercially from Dover Chemical Co. as DOVERPHOS S-9228.

Examples of phosphites and phosphonites include: triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butyl-phenyl) 4,4'-biphenylene diphosphonite, bis(2,4-di-tert-butyl-6-methylphenyl) methyl phosphite, bis(2,4-di-tert-butyl-6-methylphenyl)ethyl phosphite, 2,2',2"-nitrilo[triethyl tris(3, 3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite and 5-butyl-5-ethyl-2-(2,4,6-tri-tert-butylphenoxy)-1,3,2-dioxaphosphirane.

Combinations comprising more than one organophosphorous compound are contemplated. When used in combination the organo phosphorous compounds can be of the same type or different types. For example, a combination can comprise two phosphite or a combination can comprise a phosphite and a phosphonite. In some embodiments, phosphorus-containing stabilizers with a molecular weight greater than or equal to 300 are useful. Phosphorus-containing stabilizers, for example an aryl phosphite are usually present in the composition in an amount from 0.005 to 3 wt %, specifically 0.01 to 1.0 wt %, based on total weight of the composition.

Hindered phenols can also be used as antioxidants, for example alkylated monophenols, and alkylated bisphenols or polyphenols. Exemplary alkylated monophenols include 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2-(alpha-methylcyclohexyl)-4,6-dimethylphenol; 2,6-dioctadecyl-4-methylphenol; 2,4,6-tricyclohexylphenol; 2,6-di-tert-butyl-4-methoxymethylphenol; nonyl phenols which are linear or branched in the side chains, for example, 2,6-di-nonyl-4-methylphenol; 2,4-dimethyl-6-(1'-methylundec-1'-yl)phenol; 2,4-dimethyl-6-(1'-methylheptadec-1'-yl)phenol; 2,4-dimethyl-6-(1'-methyltridec-1'-yl)phenol and mixtures thereof. Exemplary alkylidene bisphenols include 2,2'-methylenebis(6-tert-butyl-4-methylphenol), 2,2'-methylenebis(6-tert-butyl-4-ethylphenol), 2,2'-methylenebis[4-methyl-6-(alpha-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(alpha-methylbenzyl)-4-nonylphenol], 2,2'-methylenebis[6-(alpha,alpha-dimethylbenzyl)-4-nonylphenol], 4,4'-methylenebis-(2,6-di-tert-butylphenol), 4,4'-methylenebis(6-tert-butyl-2-methylphenol), 1,1-bis(5-tert-butyl-4-hydroxy-2-methylphenyebutane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane and mixtures thereof.

The hindered phenol compound can have a molecular weight of greater than or equal to 300 g/mole. The high molecular weight can help retain the hindered phenol moiety in the polymer melt at high processing temperatures, for example greater than or equal to 300° C. Hindered phenol stabilizers, are usually present in the composition in an amount from 0.005 to 2 wt %, specifically 0.01 to 1.0 wt %, based on total weight of the composition.

Examples of mold release agents include both aliphatic and aromatic carboxylic acids and their alkyl esters, for example, stearic acid, behenic acid, pentaerythritol tetrastearate, glycerin tristearate, and ethylene glycol distearate. Polyolefins such as high-density polyethylene, linear low-density polyethylene, low-density polyethylene and similar polyolefin homopolymers and copolymers can also be used a mold release agents. Mold release agents are typically present in the composition at 0.05 to 10 wt %, based on total weight of the composition, specifically 0.1 to 5 wt %. Preferred mold release agents will have high molecular weight, typically greater than 300, to prevent loss of the release agent from the molten polymer mixture during melt processing.

In particular, an optional polyolefin can be added to modify the chemical resistance characteristics and mold release characteristics of the composition. Homopolymers such as polyethylene, polypropylene, polybutene can be used either separately or in combination. Polyethylene can be added as high-density polyethylene (HDPE), low-density polyethylene (LDPE), or a branched polyethylene. Polyolefins can also be used in copolymeric form with compounds containing carbonic acid radicals such as maleic acid or citric acid or their anhydrides, acid compounds containing acrylic acid radicals such as acrylic acid ester, and the like, as well as combinations comprising at least one of the foregoing. When present, the polyolefin, in particular HDPET, is used in an amount from more than 0 to 10 wt %, specifically 0.1 to 8 wt %, more specifically from 0.5 to 5 wt %, all based on the total weight of the composition.

In some embodiments, the polyetherimide compositions can further include at least one additional polymer. Examples of such additional polymers include and are not limited to PPSU (polyphenylene sulfone), polyetherimides, PSU (polysulfone), PPET (polyphenylene ether), PFA (perfluoroalkoxy alkane), MFA (co-polymer of TFE tetrafluoroethylene and PFVE perfluorinated vinyl ether), FEP (fluorinated ethylene propylene polymers), PPS (poly(phenylene sulfide), PTFE (polytetrafluoroethylene), PA (polyamide), PBI (polybenzimidizole) and PAI (poly(amide-imide)), poly(ether sulfone), poly(aryl sulfone), polyphenylenes, polybenzoxazoles, polybenzthiazoles, as well as blends and co-polymers thereof. When present, the polymer is used in an amount from more than 0 to 20 wt %, specifically 0.1 to 15 wt %, more specifically from 0.5 to 10 wt %, all based on the total weight of the composition. In an embodiment, no polymer other than the polyetherimide as described herein is present in the composition.

Colorants such as pigment and/or dye additives can also optionally be present. Useful pigments can include, for example, inorganic pigments such as metal oxides and mixed metal oxides such as zinc oxide, titanium dioxide, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amount from 0 to 10 wt %, specifically 0 to 5 wt %, based on the total weight of the composition. In some instances, where improved impact is desired pigments such as titanium dioxide will have a mean particle size of less than 5 microns.

The polyetherimide compositions can also optionally include a fluoropolymer in an effective amount to provide anti-drip or other beneficial properties to the polymer composition. In one instance the fluoropolymer is present in an amount 0.01 to 5.0 wt % of the composition. Examples of suitable fluoropolymers and methods for making such fluoropolymers are set forth, for example, in U.S. Pat. Nos. 3,671,487, 3,723,373, and 3,383,092. Suitable fluoropolymers include homopolymers and copolymers that comprise structural units derived from one or more fluorinated alpha-olefin monomers, for example, $CF_2=CF_2$, $CHF=CF_2$, $CH_2=CF_2$ and $CH_2=CHF$ and fluoro propylenes such as, for example, $CF_3CF=CF_2$, $CF_3CF=CHF$, $CF_3CH=CF_2$, $CF_3CH=CH_2$, $CF_3CF=CHF$, $CHF_2CH=CHF$ and $CF_3CF=CH_2$.

Copolymers comprising structural units derived from two or more fluorinated alpha-olefin monomers can also be used, for example poly(tetrafluoroethylene-hexafluoroethylene), as well as copolymers comprising structural units derived from one or more fluorinated monomers and one or more non-fluorinated monoethylenically unsaturated monomers that are copolymerizable with the fluorinated monomers such as poly(tetrafluoroethylene-ethylene-propylene) copolymers. Suitable non-fluorinated monoethylenically unsaturated monomers include for example, alpha-olefin monomers such as ethylene, propylene, butene, acrylate monomers such as, methyl methacrylate, butyl acrylate, and the like, with poly(tetrafluoroethylene) homopolymer (PTFE) preferred.

The fluoropolymer can be pre-blended in some manner with a polymer such as an aromatic polycarbonate or polyimide polymer. For example, an aqueous dispersion of fluoropolymer and a polycarbonate polymer can be steam precipitated to form a fluoropolymer concentrate for use as a drip inhibitor additive in thermoplastic polymer compositions, as disclosed, for example, in U.S. Pat. No. 5,521,230. Alternatively, the fluoropolymer can be encapsulated.

In some instances it is desired to have polyetherimide compositions that are essentially free of bromine and chlorine. "Essentially free" of bromine and chlorine means that the composition has less than 3 wt % of bromine and chlorine, and in other embodiments less than 1 wt % bromine and chlorine by weight of the composition. In other embodiments, the composition is halogen free. "Halogen free" is defined as having a halogen content (total amount of fluorine, bromine, chlorine and iodine) of less than or equal to 1000 parts by weight of halogen ppm by weight of the total composition. The amount of halogen can be determined by ordinary chemical analysis such as atomic absorption.

The polyetherimide compositions can be prepared by blending the ingredients under conditions for the formation of an intimate blend. Such conditions often include melt mixing in single or twin screw type extruders, mixing bowl, or similar mixing devices that can apply a shear to the components. Twin-screw extruders are often preferred due to their more intensive mixing capability and self-wiping capability, over single screw extruders. It is often advantageous to apply a vacuum to the blend through at least one vent port in the extruder to remove volatile impurities in the composition. Often it is advantageous to dry the PET and polyimide polymers prior to melting. The melt processing is often done at 290 to 340° C. to avoid excessive polymer degradation while still allowing sufficient melting to get an intimate polymer mixture free of any unbelted components. The polymer blend can also be melt filtered using a 40 to 100 micron candle or screen filter to remove undesirable black specks or other heterogeneous contaminants.

In an exemplary process, the various components are placed into an extrusion compounder to produce a continuous strand that is cooled and then chopped into pellets. In another procedure, the components are mixed by dry blending, and then fluxed on a mill and comminuted, or extruded and chopped. The composition and any optional components can also be mixed and directly molded, e.g., by injection or transfer molding techniques. Preferably, all of the components are freed from as much water as possible. In addition, compounding is carried out to ensure that the residence time in the machine is short; the temperature is carefully controlled; the friction heat is utilized; and an intimate blend between the components is obtained.

The polyetherimide compositions can then be molded in any equipment conventionally used for thermoplastic compositions, such as a Newbury or van Dorn type injection-molding machine with conventional cylinder temperatures, at 250° C. to 320° C., and conventional mold temperatures at 55° C. to 120° C.

The polyetherimide compositions can be formed into articles by any number of methods, for example, shaping, foaming, extruding (including profile extrusion), thermoforming, spinning, or molding, including injection molding, compression molding, gas assist molding, structural foam molding, and blow molding. In an embodiment a method of forming an article comprises shaping, extruding, blow molding, or injection molding the composition to form the article. Polyetherimide compositions can also be formed into articles using thermoplastic processes such as film and sheet extrusion, for example: melt casting, blown film extrusion, and calendaring. Co-extrusion and lamination processes can be used to form composite multi-layer films or sheets. When spun into fibers, the fibers can be woven or entangled to provide a fabric, for example a woven cloth or a felt.

Because the polyetherimide compositions have a combination of useful properties, they are useful in many applications. The excellent melt flow is especially useful for the manufacture of molded articles having a thickness form 1 to 5 millimeters. Thus, in some embodiments, an article comprises the polyetherimide composition. Examples of applications for the articles include: food service, medical, lighting, lenses, sight glasses, windows, enclosures, safety shields, and the like. The high melt flow allows the composition to be molded into intricate parts with complex shapes and/or thin sections and long flow lengths. Examples of other articles include, but are not limited to, cookware, medical devices, trays, plates, handles, helmets, animal cages, electrical connectors, enclosures for electrical equipment, engine parts, automotive engine parts, lighting sockets and reflectors, electric motor parts, power distribution equipment, communication equipment, computers and the like, including devices that have molded in snap fit connectors. The polyetherimide compositions can also be made into film and sheet as well as components of laminate systems. The sheet can be a foam sheet, paper sheet, or fabric sheet. Articles include, for example, hollow fibers, hollow tubes, fibers, sheets, films, multilayer sheets, multilayer films, molded parts, extruded profiles, coated parts, foams, windows, luggage racks, wall panels, chair parts, lighting panels, diffusers, shades, partitions, lenses, skylights, lighting devices, reflectors, ductwork, cable trays, conduits, pipes, cable ties, wire coatings, electrical connectors, air handling devices, ventilators, louvers, insulation, bins, storage containers, doors, hinges, handles, sinks, mirror housing, mirrors, toilet seats, hangers, coat hooks, shelving, ladders, hand rails, steps, carts, trays, cookware, food service equipment, communications equipment and instrument panels.

In other embodiments, the polyetherimides can be used as additives in polymer systems as well as used as toughening agent. Examples of such additional uses include and are not limited to epoxies, varnishes, powder coatings, and composites. A varnish, for example, can comprise the polyetherimide composition and a solvent, for example water, turpentine, white spirit, or mineral spirits, among others. Other varnish components can be present, for example a drying oil (such as linseed oil, tong oil, or walnut oil), a resin (such as an epoxy, acrylic, alkyd, or polyurethane), and additives known in the art. Powder compositions for forming a powder coating can comprise the polyetherimide composition and the coating powder, which generally includes the particulate resin binder (e.g., an epoxy, polyurethane, silicone, silane, or the like) and other additives such as hardeners, accelerators, fillers, and colorants.

Without further elaboration, it is believed that one skilled in the art can, using the description herein, utilize the present invention. The following examples are included to provide additional guidance to those skilled in the art of practicing the Claims. Accordingly, these examples are not intended to limit the invention in any manner

EXAMPLES

Materials

The materials in Table 1 were used or made in the following Examples and Comparative Examples.

TABLE 1

| Acronym | Description | Source |
|---|---|---|
| PA | Phthalic anhydride | |
| 3-ClPA | 3-Chlorophthalic anhydride | SABIC INNOVATIVE PLASTICS |
| 4-ClPA | 4-Chlorophthalic anhydride | SABIC INNOVATIVE PLASTICS |
| PAMI | 1,3-bis[N-(phthalimido)]benzene | Examples |
| 3-ClPAMI | 1,3-Bis[N-(3-chlorophthalimido)]benzene | Examples |
| 4-ClPAMI | 1,3-Bis[N-(4-chlorophthalimido)]benzene | Examples |
| Mono-ClPAMI | Mixture of 1-N-(3-chlorophthalimido)-3-N-(phthalimido)benzene and 1-N-(4-chlorophthalimido)-3-N-(4-chlorophthalimido)benzene | Examples |
| ClPAMI | Mixture of 1,3-bis[N-(3-chlorophthalimido)]benzene and 1,3-bis[N-(4-chlorophthalimido)]benzene | Examples |
| PA ClPAMI | Mixture of 1,3-bis[N-(3-chlorophthalimido)]benzene and 1,3-bis[N-(4-chlorophthalimido)]benzene prepared with phthalic anhydride | Examples |
| PA-free ClPAMI | Mixture of 1,3-bis[N-(3-chlorophthalimido)]benzene and 1,3-bis[N-(4-chlorophthalimido)]benzene prepared without phthalic anhydride | Examples |
| mPD | meta-Phenylene diamine | DuPont |
| $Na_2BPA$ | Bisphenol A, disodium salt | Examples |
| PCP | para-Cumyl phenol | SABIC INNOVATIVE PLASTICS |
| NaPCP | para-Cumyl phenol, sodium salt | Examples |
| oDCB | ortho-Dichlorobenzene | Fischer |
| HEGCl | Hexaethylguanidinium chloride | Atul Ltd. |
| $H_3PO_4$ | Phosphoric acid | Fischer |
| ULTEM | Polyetherimide, Mw = 38,000 Daltons (ULTEM 1010K) | SABIC INNOVATIVE PLASTICS |
| IRGAFOS 168 | Tris(2,4-di-tert-butylphenyl)phosphite | CIBA Specialty Chemicals |
| IRGAFOS 168 phosphate | Tris(2,4-di-tert-butylphenyl)phosphate | Examples |

Property Testing

Weight average molecular weight (Mw) of the polymer product was determined by gel permeation chromatography (GPC) using polystyrene standards.

Residual ClPAMI, mono-ClPAMI, and PAMI contents were determined by high pressure liquid chromatography (HPLC). The detection limit was 25 ppm.

Residual chlorine was measured by total ion chromatography combustion and/or hexylamine digestion.

Polymer hydroxyl and amine end groups were identified and quantitated by derivatization with a phosphorylation reagent, followed by phosphorous-31 nuclear magnetic resonance spectroscopy ($^{31}$P-NMR).

Water (moisture) content of reaction mixtures was determined by Karl-Fisher Titration.

Unnotched Izod impact strength was measured at 23° C. according to ASTM D4812.

Melt flow rate was measured at 337° C. and a load of 6.6 kg according to ASTM D1238-10.

To determine total plate-out weight, a mold 5 inches wide and 6 inches high (12.7 cm×15.2 cm) was filled to 50% of its capacity with polymer, and 200 shots were completed. The temperature of the injected polymer was 700° F. (371° C.), while the mold temperature was 100° F. (37.8° C.). The most volatile materials present in the polymer form an undesirable layer at the polymer liquid level in the mold. The weight of this layer was the total plate-out weight.

Where indicated, "dry oDCB" having moisture content of less than 10 ppm was used in the reactions and polymerizations. The dry oDCB was kept in a glove box over 4 A° molecular sieves.

Synthetic Procedures

ClPAMI Prepared with Phthalic Anhydride ("PA ClPAMI")

To prepare ClPAMI in the presence of phthalic anhydride, 13.9 grams (g) of a mixture of 3-ClPA and 4-ClPA (5:95 weight ratio) and phthalic anhydride (PA, 0.14 g) were reacted with m-phenylenediamine (mPD, 4.12 g) in o-dichlorobenzene (oDCB, 85 mL) in a 250-mL, three-necked flask equipped with a stopper and a gas valve. The flask was then equipped with a stirring shaft and bearing, nitrogen adapter and a Dean Stark trap receiver topped with a reflux condenser. A gentle sweep of nitrogen was established through the headspace of the vessel. The reaction was then heated to 100° C. and then ramped slowly to 200° C. After the ClPAMI was formed, as determined by HPLC analysis, bulk water generated as a byproduct of the reaction was removed by reflux using a Dean-Stark trap to provide a slurry of ClPAMI in oDCB. The ClPAMI slurry in oDCB was cooled to room temperature and sufficient hexane was added to the slurry to precipitate a white solid. The mixture was filtered to isolate the ClPAMI, and the ClPAMI was dried under nitrogen at 180° C. A white powder was obtained.

ClPAMI Prepared without Phthalic Anhydride ("PA-free ClPAMI")

To prepare PA-free ClPAMI, 140.5 g of a mixture of 3-ClPA and 4-ClPA (5:95 weight ratio) was reacted with mPD (41.2 g) in 850 mL of o-dichlorobenzene in a 1000 mL three-necked flask equipped with a stopper and a gas valve. The flask was then equipped with a stirring shaft and bearing, nitrogen adapter and a Dean Stark trap receiver topped with a reflux condenser. A gentle sweep of nitrogen was established through the head-space of the vessel. The reaction was then heated to 100° C. and then ramped slowly to 200° C. After the ClPAMI was formed, as determined by HPLC analysis, bulk water generated as byproduct of the reaction was eliminated by reflux using a Dean-Stark trap to provide a slurry of ClPAMI in oDCB. Then, the ClPAMI slurry in oDCB was cooled to room temperature, and hexane (1000 mL) was added to the slurry to precipitate a white solid. The mixture was filtered to isolate the ClPAMI, and the ClPAMI was dried under nitrogen at 180° C. A white powder was obtained.

$Na_2BPA$ $Na_2BPA$ was obtained by mixing sodium hydroxide with bisphenol A in a molar ratio of 2:1 at 70° C. in demineralized water under nitrogen to form a solution. Then the solution was added slowly to boiling oDCB in a reactor equipped with a Dean Stark condenser until all the salt was suspended in oDCB and the water was eliminated to a moisture content of less than 20 ppm. The oDCB was then removed using a rotary evaporator followed by Kugelrohr vacuum distillation at 250° C. under nitrogen to yield a white solid. The white solid obtained was kept in a nitrogen glove box to prevent rehydration and oxidation.

NaPCP

The monosodium salt of p-cumylphenol (NaPCP) was obtained by mixing 0.25 moles of sodium hydroxide with 0.25 moles of p-cumylphenol (PCP) at 75° C. in 100 mL deoxygenated water under nitrogen to form a solution. Then the solution was added slowly through an addition funnel to boiling oDCB in a reactor equipped with a Dean Stark condenser until all of the salt was suspended in oDCB and the water was eliminated to a moisture content of less than 20 ppm. Dry oDCB was added to the slurry to a final weight of 585.5 g to provide a 0.1M slurry of NaPCP.

Polymerization Procedure

In the following Examples, polymerization was conducted in a reactor system having a three-necked flask fitted with a nitrogen inlet and outlet and a Dean-Stark trap topped with a condenser to remove traces of water from the reaction mixture of ClPAMI and BPA disodium salt prior to HEGCl catalyst addition ("Isolated ClPAMI Procedure"). An alternative setup consists of a five-necked flask fitted with an internal temperature probe, a Dean-Stark trap topped with a condenser to remove water formed during the polymerization, a nitrogen inlet, a mechanical stirrer, and an addition tube with a valve in communication with a second flask containing a $Na_2BPA$/NaPCP slurry in oDCB at an appropriate concentration ("In Situ ClPAMI Procedure"). All polymerizations were conducted under nitrogen using oDCB as solvent, with mechanical stirring, and a heated oil bath to control temperature. HEGCl, a phase transfer catalyst, was added in an amount of 0.6 weight %, based on the ClPAMI amount, at 180° C., to initiate polymerization. Typically, the polymerizations were conducted at a 25 weight % solids content. The polymerizations were continued until the desired Mw was obtained, as determined by GPC. Two different polymerization procedures can be followed, the "Isolated ClPAMI Procedure" or the "In Situ ClPAMI Procedure."

In the "Isolated ClPAMI Procedure," the three-necked flask setup described above was used. Dry pure monomers in powder form were mixed together in the amounts specified in the Examples with oDCB as solvent, and were heated to 180° C. ODCB was collected in the Dean-Stark trap by distillation until a moisture content of less than 20 ppm was observed. Then, HEGCl was added to initiate polymerization.

In the "In Situ ClPAMI" procedure, the five-necked flask setup described above was used. The ClPAMI was synthesized in the five-necked flask by reacting two moles of chlorophthalic anhydride with one mole of mPD using oDCB as solvent. The water formed was removed by distillation until a moisture content of less than 20 ppm in the distillate was obtained. Then, HEGCl, a phase transfer catalyst, was added in an amount of 0.6 weight %, based on the ClPAMI amount. More oDCB was distilled off to confirm that the moisture level was less than 20 ppm in the distillate. Then, a slurry of $Na_2BPA$ and NaPCP in oDCB in the second flask was transferred to the five-necked flask using the addition tube in communication with the second flask, and polymerization was conducted at 180° C.

Examples 1-13

These Examples illustrate the effect of NaPCP when used as an end-capping agent in the polymerization on the residual ClPAMI content in the "Isolated ClPAMI Procedure."

Example 1

8.32 g of PA ClPAMI and 5.11 g of $Na_2BPA$ were mixed in dry oDCB to a final concentration of 20% solids in a reactor system as described above. The mixture was heated to 180° C. and then HEGCl catalyst was added to the mixture. The monomers were polymerized to provide 11.3 g of a polyetherimide having an Mw of 46650 Daltons and having a ClPAMI residual content of 478 ppm, based on a total weight of the polyetherimide.

Example 2

9.15 g of PA-free ClPAMI and 5.62 g $Na_2BPA$ were mixed in dry oDCB and 0.1 g NaPCP was added. The final concentration of solids was calculated to be 20% in a reactor system as described above. The mixture was heated to 180° C., and then HEGCl was added to the mixture and polymerization was completed to provide 12.4 g of polymer with an Mw of 45544 Daltons and having a ClPAMI residual content of 341 ppm, based on a total weight of the polymer.

Example 3

8.32 g of PA-free ClPAMI and 5.11 g of $Na_2BPA$ were mixed in dry oDCB, and 0.09 g of NaPCP was added. The final concentration of solids was calculated to be 20% in a reactor system as described above. The mixture was heated to 180° C., and then HEGCl catalyst was added to the mixture and polymerization was completed to provide 11.3 g of polyetherimide with an Mw of 45875 Daltons and having a ClPAMI residual content of 341 ppm, based on the total weight of the polyetherimide.

Example 4

8.32 g of PA-free ClPAMI and 5.11 g of Na$_2$BPA were mixed in dry oDCB, and 0.12 g NaPCP was added. The final concentration of solids was calculated to be 20%. The mixture was heated to 180° C. and then HEGCl catalyst was added to the mixture and polymerization was completed to provide 11.3 g of polyetherimide with an Mw of 47758 Daltons and having a ClPAMI residual content of 150 ppm, based on a total weight of the polyetherimide.

Example 5

8.32 g of PA-free ClPAMI and 5.11 g of Na$_2$BPA were mixed in dry oDCB, and 0.17 g NaPCP was added. The final concentration of solids was calculated to be 20% in a reactor system like picture 1. The mixture was heated to 180° C. and then HEGCl catalyst was added to the mixture and polymerization was completed to provide 11.3 g of polyetherimide with an Mw of 45687 Daltons and having a ClPAMI residual content of 50 ppm, based on a total weight of the polyetherimide.

Example 6

8.32 g of PA-free ClPAMI and 5.14 g of Na$_2$BPA were mixed in dry oDCB and 0.06 g NaPCP was added. The final concentration of solids was calculated to be 20% in a reactor system as described above. The mixture was heated to 180° C. and then HEGCl catalyst was added to the mixture and polymerization was completed to provide 11.3 g of polyetherimide with an Mw of 47719 Daltons and having a ClPAMI residual content of 101 ppm, based on a total weight of the polyetherimide.

Example 7

8.32 g of PA-free ClPAMI and 5.14 g of Na$_2$BPA were mixed in dry oDCB and 0.07 g NaPCP was added. The final concentration of solids was calculated to be 20% in a reactor system as described above. The mixture was heated to 180° C. and then HEGCl catalyst was added to the mixture and polymerization was completed to provide 11.3 g of polyetherimide with an Mw of 44381 Daltons and having a ClPAMI residual content of 103 ppm, based on a total weight of the polyetherimide.

Example 8

8.43 g of PA-free ClPAMI and 5.21 g of Na$_2$BPA were mixed in dry oDCB and 0.10 g NaPCP was added. The final concentration of solids was calculated to be 20% in a reactor system as described above. The mixture was heated to 180° C. and then HEGCl catalyst was added to the mixture and polymerization was completed to provide 11.4 g of polyetherimide with an Mw of 45029 Daltons and having a ClPAMI residual content of 55 ppm, based on a total weight of the polyetherimide.

Example 9

8.32 g of PA-free ClPAMI and 5.14 g of Na$_2$BPA were mixed in dry oDCB and 0.16 g NaPCP was added. The final concentration of solids was calculated to be 20% in a reactor system as described above. The mixture was heated to 180° C. and then HEGCl catalyst was added to the mixture and polymerization was completed to provide 11.3 g of polyetherimide with an Mw of 43485 Daltons and having a ClPAMI residual content of 116 ppm, based on a total weight of the polyetherimide.

Example 10

8.32 g of PA-free ClPAMI and 5.18 g of Na$_2$BPA were mixed in dry oDCB and 0.36 g NaPCP was added. The final concentration of solids was calculated to be 20% in a reactor system as described above. The mixture was heated to 180° C. and then HEGCl catalyst was added to the mixture and polymerization was completed to provide 11.3 g of polyetherimide with an Mw of 30884 Daltons. Residuals were non-detectable.

Example 11

8.59 g of PA-free ClPAMI and 5.35 g of Na$_2$BPA were mixed in dry oDCB and 0.18 g of NaPCP was added. The final concentration of solids was calculated to be 20% in a reactor system as described above. The mixture was heated to 180° C. and then HEGCl catalyst was added to the mixture and polymerization was completed to provide 11.6 g of polyetherimide with an Mw of 44907 Daltons having a ClPAMI residual content of 55 ppm, based on a total weight of the polyetherimide.

Example 12

8.32 g of PA-free ClPAMI and 5.18 g of Na$_2$BPA were mixed in dry oDCB and 0.12 g of NaPCP was added. The final concentration of solids was calculated to be 20% in a reactor system as described above. The mixture was heated to 180° C. and then HEGCl catalyst was added to the mixture and polymerization was completed to provide 11.3 g of polyetherimide with an Mw of 48416 Daltons. Residual ClPAMI was non-detectable

Example 13

6.32 g of PA free ClPAMI and 3.93 g of Na$_2$BPA were mixed in dry oDCB and 0.10 g of NaPCP was added. The final concentration of solids was calculated to be 20% in a reactor system as described above. The mixture was heated to 180° C. and then HEGCl catalyst was added to the mixture and polymerization was completed to provide 8.6 g of polyetherimide with an Mw of 41396 Daltons having a ClPAMI residual content of 47 ppm, based on a total weight of the polyetherimide.

Results

The final Mw of the polyetherimide, the mol % excess of ClPAMI used, the final ratio of the —ONa to —Cl reactive ends groups, and residual ClPAMI amount in the polyetherimide are summarized in Table 2. "Excess ClPAMI" is the mole percent of excess ClPAMI used in the reaction relative to moles of Na$_2$BPA. "ONa/Cl" is the mole ratio of phenoxide groups (from Na$_2$BPA and NaPCP, if present) to chloride (from the ClPAMI). "NaPCP (mol %)" was the mole percent of NaPCP based on moles of ClPAMI.

TABLE 2

| Ex | Excess ClPAMI (mol %) | ONa/Cl | NaPCP (mol %) | Mw (Daltons) | residual ClPAMI (ppm) | Unnotched Izod Impact*** | Melt Flow Index**** |
|---|---|---|---|---|---|---|---|
| 1* | 1.45 | 0.986 | 0 | 46550 | 478 | No | Yes |
| 2* | 1.45 | 0.996 | 2.01 | 45544 | 341 | No | Yes |
| 3* | 1.45 | 0.996 | 2.01 | 45875 | 341 | No | Yes |
| 4* | 1.45 | 0.999 | 2.72 | 47758 | 150 | No | Yes |
| 5* | 1.45 | 1.004 | 3.73 | 45687 | 50 | No | Yes |
| 6* | 0.87 | 0.999 | 1.45 | 47719 | 101 | No | Yes |
| 7* | 0.87 | 0.999 | 1.63 | 44381 | 103 | No | Yes |
| 8* | 0.87 | 1.002 | 2.20 | 45029 | 55 | No | Yes |
| 9* | 0.87 | 1.009 | 3.64 | 43485 | 116 | No | Yes |
| 10 | 0.10 | 1.039 | 8.08 | 30884 | ND** | Yes | Yes |
| 11* | 0.06 | 1.019 | 3.91 | 44907 | 55 | No | Yes |
| 12* | 0.10 | 1.012 | 2.70 | 48416 | ND** | No | Yes |
| 13* | 0.22 | 1.013 | 3.02 | 41396 | 47 | No | Yes |

*Comparative Example
**None detected (Less than 25 ppm)
***Unnotched Izod impact strength of lesser than or equal to 25 ft-lbs/in, , when determined according to ASTM D4812 at 23° C.
****Melt flow index of greater than 22 g/10 min when determined according to ASTM D1238, at 337° C./6.6 kg.

Discussion

A comparison of Comparative Example 1 to the other examples shows that the presence of NaPCP reduces residual ClPAMI content. A comparison of Comparative Examples 2 and 3 to Comparative Example 5 shows that at constant mol % excess of ClPAMI and Mw of the polyetherimide, the residual ClPAMI content was reduced by increasing the mol % of NaPCP. A comparison of Comparative Example 3 to Comparative Examples 8 and 11 shows that at constant NaPCP amount, and lower mol % excess of ClPAMI, residual ClPAMI content was reduced while Mw was maintained constant.

These results show that PCP is an effective end-capping agent, and a large excess of ClPAMI is not needed to control Mw. Example 10 shows that a large amount of NaPCP will end-cap the chloride reactive end groups of the growing polyetherimide chains to the extent that the desired Mw of less than 43,000 Daltons was obtained.

Examples 14-16

Examples 14-16 illustrate the effect of NaPCP when used as an end-capping agent in the polymerization on the residual ClPAMI content in the "In Situ ClPAMI Procedure."

Example 14

In a first reactor, 8.32 g of PA-free ClPAMI was suspended in dry oDCB and heated to 180° C., then 0.05 g HEGCl catalyst was added. In a second reactor, an oDCB slurry containing 5.06 g of Na$_2$BPA, 0.2 g of NaPCP, and dry oDCB was kept at 125° C. with magnetic stirring under nitrogen. When the moisture content of the first reactor was less than 20 ppm in the vapor phase as determined by Karl-Fisher analysis of the condensate), the slurry in the second reactor was transferred into the first reactor by applying a nitrogen overpressure to the second reactor. The transfer takes place in 20-30 minutes. The polymerization was completed and 11.3 g of polyetherimide with an Mw of 41396 Daltons and having a ClPAMI residual content of 52 ppm, based on a total weight of the polyetherimide, was obtained.

Example 15

In a first reactor, 8.32 g of PA-free ClPAMI was suspended in dry oDCB and heated to 180° C., then 0.05 g HEGCl catalyst was added. In a second reactor, an oDCB slurry containing 5.17 g of Na$_2$BPA, 0.19 g of NaPCP, and dry oDCB was kept at 125° C. with magnetic stirring under nitrogen. When the moisture content of the first reactor was less than 20 ppm in the vapor phase, the slurry in the second reactor was transferred to the first reactor by applying nitrogen overpressure to the second reactor. The transfer takes place in 20-30 minutes. The polymerization was completed and 11.3 g of polyetherimide with an Mw of 48264 Daltons and having a residuals content less than 50 ppm, based on the total weight of the polyetherimide, was obtained.

Example 16

In a first reactor, 8.32 g of PA-free ClPAMI was suspended in dry oDCB and heated to 180° C., then 0.05 g HEGCl catalyst was added. In a second reactor, an oDCB slurry containing 5.11 g of Na$_2$BPA, 0.18 g of NaPCP, and dry oDCB was kept at 125° C. with magnetic stirring under nitrogen. When the moisture content of the first reactor was less than 20 ppm in the vapor phase, the slurry in the second reactor was metered to the first reactor by applying a nitrogen overpressure to the second reactor. The transfer takes place in 20-30 minutes. The polymerization was completed and 11.3 g of polyetherimide with a Mw of 43875 Daltons and a residuals content of less than 50 ppm, based on a total weight of the polyetherimide, was obtained.

Examples 17A-17D and 17A-2 to 17D-2

Comparative Example 17D illustrates the preparation and properties of a comparative polymer composition manufactured by combining the three polymers of Comparative Examples 17A, 17B, and 17C, manufactured in the absence of PA and the presence of a NaPCP during polymerization. Comparative Example 17D-2 illustrates the preparation and properties of a comparative polymer composition manufactured by combining the three polymers of Comparative Examples 172, 17B-2, and 17C-2, manufactured in the presence of PA and the absence of a NaPCP during polymerization.

Comparative Example 17A 347.8 pounds (157.8 kg) of a mixture of 3-ClPA and 4-ClPA (5:95 weight ratio) was charged in a polymer reactor with 860 kg oDCB and heated to 165° C. Next, 103 pounds (46.7 kg) of mPD was added. Once the ClPAMI was formed, water was distilled off until the moisture content of the distilled oDCB was less than 20 ppm as determined by Karl-Fisher titration. During the distillation, the ClPAMI solids content was kept constant at 18 weight % by adding fresh oDCB to compensate for distilled oDCB. Then, 1.25 kg HEGCl was added to the ClPAMI slurry and oDCB was distilled to achieve a water content of less than 20 ppm. 542 Kg of a slurry mixture containing 420.86 kg of oDCB, 117.18 kg $Na_2BPA$, and 3.96 kg NaPCP (3.40% w/w NaPCP vs. $Na_2BPA$, 3.99 mol % NaPCP vs. $Na_2BPA$) containing less than 20 ppm water was transferred to the reactor containing the ClPAMI to produce the polyetherimide. The final Mw of the polyetherimide was 45059 Daltons. The polyetherimide was processed and purified to obtain a 20% solution in oDCB.

Comparative Example 17B 347.8 pounds (157.8 kg) of a mixture of 3-ClPA and 4-ClPA mixture (5:95 weight ratio) was charged in a polymer reactor with dry oDCB and heated up to 165° C. Next, 103 pounds (46.7 kg) of mPD were added. Once the ClPAMI was formed, water was distilled off until the moisture content of the distilled oDCB was less than 20 ppm as determined by Karl-Fisher titration. During the distillation, the ClPAMI solids content was kept constant at 18 weight % by adding fresh oDCB to compensate for distilled oDCB. Then, 1.25 kg HEGCl was added to the ClPAMI slurry and oDCB was distilled to achieve a water content of less than 20 ppm. 540.6 Kg of slurry mixture containing 415.29 kg of oDCB, 120.88 kg $Na_2BPA$, and 4.43 kg NaPCP (3.69% w/w NaPCP vs. $Na_2BPA$, 4.23 mol % NaPCP vs. $Na_2BPA$) containing less than 20 ppm water was transferred to the reactor containing the ClPAMI to produce the polyetherimide. The final Mw of the polyetherimide was 44650 Daltons. The polyetherimide was processed and purified to obtain a 20% solution in oDCB.

Comparative Example 17C 347.8 pounds (157.8 kg) of a mixture of 3-ClPA and 4-ClPA mixture (5:95 weight ratio) was charged in a polymer reactor with dry oDCB and heated up to 165° C. Next, 103 pounds (46.7 kg) of mPD were added. Once the ClPAMI was formed, water was distilled off until the moisture content of the distilled oDCB was less than 20 ppm as determined by Karl-Fisher titration. During the distillation, the ClPAMI solids content was kept constant at 18 weight % by adding fresh oDCB to compensate for distilled oDCB. Then, 1.25 kg HEGCl was added to the ClPAMI slurry and oDCB was distilled to achieve a water content of less than 20 ppm. 536.3 Kg of slurry mixture containing 406.84 kg of oDCB, 124.74 kg $Na_2BPA$, and 4.72 kg NaPCP (3.79% w/w NaPCP vs. $Na_2BPA$, 4.39 mol % NaPCP vs. $Na_2BPA$) containing less than 20 ppm water was transferred to the reactor containing the ClPAMI to produce the polyetherimide. The final Mw of the polyetherimide was 44153 Daltons. The polyetherimide was processed and purified to obtain a 20% solution in oDCB.

Results

The results are summarized in Table 3. "NaPCP/$Na_2BPA$" was the mole ratio of NaPCP to $Na_2BPA$. "Cl/ONa" was the mole ratio of Cl end groups to total phenoxide end groups derived from both NaPCP and $Na_2BPA$. The only residual observed was ClPAMI. Residual ClPAMI was measured on the polyetherimide solution prior to devolatilization.

TABLE 3

| | Units | Ex 17A | Ex 17B | Ex 17C |
|---|---|---|---|---|
| ClPAMI/BPA (mole ratio) | — | 1.005 | 1 | 1.004 |
| NaPCP/$Na_2BPA$ | Mole % | 3.998 | 4.226 | 4.397 |
| Cl/ONa (mole ratio) | — | 0.99 | 0.98 | 0.98 |
| Mw of Polymer | Daltons | 45059 | 44650 | 44153 |
| Residual ClPAMI (in polyetherimide solution) | ppm | 140 | 160 | 300 |

Comparative Example 17D

The polymer solutions of Examples 17A to 17C were devolatized, melt-mixed together with an additives package comprising IRGAFOS 168, and extruded to yield pellets of a polyetherimide composite. (Example 17D) The total residuals content of the polyetherimide composite was 159 ppm, based on the weight of the polyetherimide composite. The total chloride content as measured by HPLC was 2153 ppm, based on the total weight of the polyetherimide composite. The OH end group content, as measured by P31-NMR was 330 ppm, based on the total weight of the polyetherimide composite. The results of end group analysis of the polyetherimide composite were provided in Table 3. The end group structures were as follows:

Chlorine:

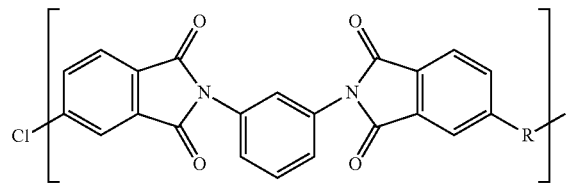

PCP:

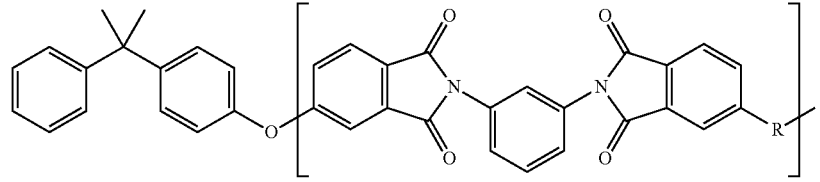

-continued

Hydroxy:

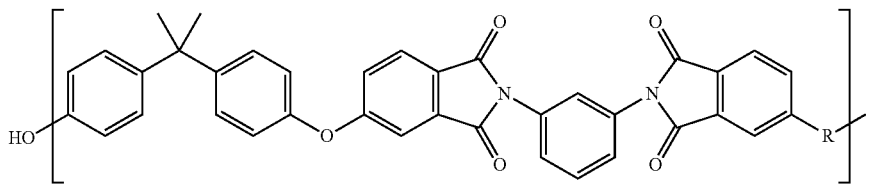

TABLE 4

| End Group | End Group Amt. (wt %*) | End Group Amt. (ppm by wt.**) | End Group Amt. (wt. %*) |
|---|---|---|---|
| Method | Theoretical*** | Measured by HPLC | Measured by HPLC |
| Chlorine (MW = 35) | 35.7 | 2153 | 36 |
| PCP (MW = 211) | 49.2 | 39630 | 53 |
| Hydroxyl (MW = 17) | 13.6 | 322 | 11 |

*Based on 100 wt. % total end groups.
**Based on the wt. of the polyetherimide composite.
***330 ppm OH end groups as determined by P31-NMR was used for the calculations.

The results in Table 4 show that about 50% of the end groups of the polyetherimide composite were derived from NaPCP, which was close to the theoretical amount. These data show that NaPCP was an effective end-capping agent.

Polyetherimide was produced using the same process as Examples 17A to 17C except that PA ClPAMI was used instead of ClPAMI, and the NaPCP was omitted. The results are summarized in Table 5. "PA/ClPA" was the mole % of PA based on the moles of ClPA. The residual monomer content was the total of ClPAMI and PAMI, based on the weight of the polyetherimide composite.

TABLE 5

|  | Units | CEx 17A-2 | CEx 17B-2 | CEx 17C-2 |
|---|---|---|---|---|
| PA/ClPA | Mole % | 0.91 | 0.92 | 0.81 |
| Mw | Daltons | 46122 | 42320 | 43379 |
| Residual Monomer | ppm | 578 | 712 | 564 |

Comparative Example 17D-2

The polymer solutions of Comparative Examples 17A-2 to 17C-2 were mixed together with an additive package comprising IRGAFOS 168 and extruded to yield pellets of a polyetherimide composite using the same process as used in Example 17D-2. The total residual monomer content (ClPAMI and PAMI) was 613 ppm, based on the weight of the polyetherimide composite. The total chloride content, as measured by HPLC was 4266 ppm, based on the weight of the polyetherimide composite. A comparison of the results of Example 17D (Table 4) to Comparative Example 17D (Table 5) shows that the presence of NaPCP in the absence of PA during manufacture of the polyetherimide reduces the amount of residual monomer as well as the content of chlorine end groups in the polyetherimide.

Analysis of Example 17D, Comparative Example 17D, and Commercial Polyetherimide

The plate-out materials of polyetherimide composite of Example 17D, the polyetherimide composite of Comparative Example 17D, and commercially available polyetherimide (ULTEM 1010K) were collected and analyzed for IRGAFOS 168 phosphite content, IRGAFOS 168 phosphate content (i.e. oxidized IRGAFOS 168), PAMI content, mono-ClPAMI content, ClPAMI content, and total plate-out weight. The results were provided in Table 6.

TABLE 6

| Compound | ULTEM | CEx 17D | Ex 17D |
|---|---|---|---|
| IRGAFOS 168 phosphite (wt %) | 34 | nd | nd |
| IRGAFOS 168 phosphate (wt %) | 66 | 40 | 100 |
| PAMI (wt %) | Nd | 14 | nd |
| Mono-ClPAMI (wt %) | Nd | 14 | nd |
| ClPAMI (wt %) | Nd | 32 | nd |
| Total Plate-out Amt. (mg) | 1.1 | 1.6 | 0.7 |

* nd = none detected

The results of Table 6 show that the total plate-out weight was greater when the amount of residuals present in the polyetherimide (e.g., PAMI, mono-ClPAMI, and ClPAMI) was greater, as in Comparative Example 17D. Also, the polyetherimide composite of Example 17D, which was end-capped with NaPCP in the absence of PA, provided the lowest plate-out.

Comparative Examples 18A-18C

Examples 18A-C illustrate the effect of various reaction parameters on the level of residual monomer in polyetherimide.

Comparative Example 18A 23.034 kg of a mixture of 3-ClPA and 4-ClPA (5:95 weight ratio) and 0.2315 kg of PA were reacted with 7.164 kg of mPD in dry oDCB. Once the ClPAMI was formed and moisture level was below 20 ppm in the oDCB distillate, 0.28 kg HEGCl was added to the reactor, and the mixture was dried again until the water content of the oDCB distillate was less than 20 ppm. Then 17.75 kg Na$_2$BPA slurry was charged, and the polymerization was conducted following the same procedure as used in Example 17. The final Mw of the polyetherimide was 44,000 Daltons and the polyetherimide was processed and purified to provide a 20% polyetherimide solution in dry oDCB.

Example 18B 23.036 kg of a mixture of 3-ClPA and 4-ClPA (5:95 weight ratio) were reacted with 7.164 kg of mPD in dry oDCB. Once the ClPAMI was formed and the water content of the oDCB distillate was below 20 ppm, 0.33 kg HEGCl was added to the reactor, and the mixture was dried again until the water content of the oDCB distillate was less than 20 ppm. Then a mixture of 17.996 kg Na$_2$BPA slurry and 4.25 mol % of NaPCP, based on the moles of Na$_2$BPA, was added. The polymerization was conducted following the same procedure as used in Example 17. The final Mw of the polyetherimide was 42,000 Daltons and the polyetherimide was processed and purified to provide a 20% polymer solution in oDCB.

Comparative Example 18C 24.0 kg of a mixture of 3-ClPA and 4-ClPA (5:95 weight ratio) were reacted with 7.16 kg of mPD in dry oDCB. Once the ClPAMI was formed and the water content of the oDCB distillate was below 20 ppm, 0.28 kg HEGCl was added to the reactor and the mixture was dried again until the water content of the oDCB distillate was less than 20 ppm. Then 17.767 kg of a mixture of $Na_2BPA$ and 3.66 mol % NaPCP, based on the moles of $Na_2BPA$, was added. The polymerization was conducted at a pressure of 10 pounds-force per square inch gauge (psig) (0.069 MPa) in the vessel, while increasing the polymerization temperature to 190° C. The final Mw of the polyetherimide was 44,500 Daltons, and the polyetherimide was processed and purified to provide a 20% polyetherimide solution in oDCB.

The reaction conditions, including the pressure used during the polymerization, residual monomer content, and weight average molecular weight of the polyetherimides of are summarized in Table 7.

TABLE 7

| | ONa/Cl (mole ratio) | NaPCP/ $Na_2BPA$ (mol %) | Pressure | Mw (Daltons) | ClPAMI (ppm) | PAMI (ppm) |
|---|---|---|---|---|---|---|
| CEx 18A | 0.990 | 0.00 | Atmospheric | 44000 | 500 | 170 |
| Ex 18B | 1.01 | 4.25 | Atmospheric | 42000 | 147 | 0 |
| CEx 18C | 1.00 | 3.66 | 10 psig | 44500 | 105 | 0 |

The results shown in Table 7 show that the absence of NaPCP and the presence of PA results in a greater total residual monomer (ClPAMI, and PAMI) content in the polyetherimide. Example 18C shows that increasing the pressure during the polymerization results in further reduction in the residual monomer content. Thus, increased pressure can be used with greater than or equal to 5 mole % endcap agent to achieve a polyetherimide having an Mw of less than 43,000 Daltons and low residual monomer content.

Plate-out analyses were conducted for the polyetherimide of Example 18B and three commercially available polyetherimides, ULTEM 1010, and two ULTEM 1010 polymers manufactured to have low residual monomer content (ULTEM Low-1 and ULTEM Low-2), each of which was available from SABIC Innovative Plastics. The results are summarized in Table 8.

TABLE 8

| Sample | Residual Material | Unit | Ex 18B | ULTEM 1010 | ULTEM Low-1 | ULTEM Low-2 |
|---|---|---|---|---|---|---|
| Pellets | IRGAFOS 168 | µg/g | 64 | 207 | 220 | 162 |
| Pellets | Residual Monomer | µg/g | 7 | 245 | 0 | 0 |
| Plate-out | IRGAFOS 168 | µg/g | 138 | 623 | 268 | 478 |
| Plate-out | Residual Monomer | µg/g | 0 | 702 | 0 | 0 |

The plate-out material of ULTEM 1010, which includes PA in its manufacture, has the highest content of residual monomer. Example 18B, ULTEM Low-1 and ULTEM Low-2 have no residual monomer in the plate-out material. The only plate-out material was IRGAFOS 168, an additive. The results obtained with Example 18B further illustrate the advantage of the inventive polyetherimide compositions.

Examples 19-23

The purpose of these examples was to evaluate the effect that the alkali metal salt of the monohydroxy aromatic compound has on the molecular weight of polyetherimide resins.

Example 19

25 g of PA free ClPAMI was reacted with a total of 64.3 g of oDCB/salt slurry that contains 16.6 g of Na2BPA and 1.5 g of NaPCP using 0.6 ml of HEGCl catalyst (20% oDCB solution). The final concentration of solids was calculated to be 20% in a reactor system as described in previous examples. The polymerization was completed at 180° C. to provide 34 g of a polymer with a Mw of 9184 Daltons and having a total ClPAMI content of 1200 ppm, based on a total weight of the polymer. The obtained Mw weight was very low due to high amount of endcap molecule (NaPCP=10.6% on molar basis vs. $Na_2BPA$).

Our results show that when the alkali metal salt of the monohydroxy aromatic compound (NaPCP) was added in a molar amount of 10.6%, the molecular weight of the resulting polymers were substantially below 43,000 Daltons. Further, the residuals that were obtained were relatively high. Residuals are anomalously high due to the low Mw of the polymer.

Example 20

25 g of PA free ClPAMI was reacted with a total of 64.3 g of oDCB/salt slurry that contains 16.6 g of $Na_2BPA$ and 2.2 g of NaPCP using 0.6 ml of HEGCl catalyst (20% oDCB solution). The final concentration of solids was calculated to be 20% in a reactor system as described in previous examples. The polymerization was completed at 180° C. to provide 34 g of a polymer mass with a Mw of less than 7500 Daltons and having a total ClPAMI content of greater than 500 ppm, based on a total weight of the polymer. The obtained Mw weight was very low due to high amount of endcap molecule (NaPCP 15.3% on molar basis vs Na2BPA). Residuals were anomalously high due to the low Mw of the polymer.

Our results show that when the alkali metal salt of the monohydroxy aromatic compound (NaPCP) was added in a molar amount of 10.6%, the molecular weight of the resulting polymers were substantially below 43,000 Daltons (about 7,500 Daltons).

Example 21

25.32 g of PA free ClPAMI were reacted with a total of 76.67 g of oDCB/salt slurry that is 19.98% rich in $Na_2BPA$ and 1.375% rich in NaPCP using 0.6 ml of HEGCl catalyst (20% oDCB solution). The final concentration of solids is calculated to be 20% in a reactor system as described in previous examples. The polymerization is completed at 180° C. to provide 34 g of a polymer mass with a Mw of 28,900 Daltons and having a total ClPAMI content of less than 100 ppm, based on a total weight of the polymer. The content of the Cl ends of the polymer is less than 1000 ppm with respect to the polymer.

Our results show that when the alkali metal salt of the monohydroxy aromatic compound (NaPCP) was added in a molar amount of 10.6%, the molecular weight of the resulting polymers were about 30,000 Daltons, which is substantially below 43,000 Daltons.

Example 22

83 g of PA free ClPAMI were reacted with a total of 244.5 g of oDCB/salt slurry that was 21.1% rich in Na2BPA and 1% rich in NaPCP using 1.93 ml of HEGCl catalyst (20% oDCB solution). The final concentration of solids was calculated to be 20% in a reactor system as described in previous examples. The polymerization is completed at 180° C. to provide 112.5 g of a polymer mass with a Mw of 36,524 Daltons and having a total ClPAMI content of less than 100 ppm, based on a total weight of the polymer. The content of the Cl ends of the polymer is less than 1000 ppm in reference to polymer.

Our results show that when the alkali metal salt of the monohydroxy aromatic compound (NaPCP) was added in a molar amount of 5.5%, the molecular weight of the resulting polymers were substantially below 43,000 Daltons (i.e., about 36,000 Daltons).

Example 23

34.72 g of PA free ClPAMI are reacted with a total of 186.9 g of oDCB/salt slurry that is 11.57% rich in Na2BPA and 0.5% rich in NaPCP using 1 ml of HEGCl catalyst (20% oDCB solution). The final concentration of solids is calculated to be 20% in a reactor system as described in previous examples. The polymerization is completed at 180° C. to provide 47 g of a polymer mass with a Mw of 39914 Daltons and having a total ClPAMI content of less than 100 ppm, based on a total weight of the polymer. The content of the Cl ends of the polymer is 1400 ppm based on the polymer.

Our results show that when the alkali metal salt of the monohydroxy aromatic compound (NaPCP) was added in a molar amount of 5%, the molecular weight of the resulting polymers were below 43,000 Daltons.

Table 9 shows the amount of NaPCP used on the experiments, the final ratio ONa/Cl for the Mw achieved, and the residuals content. Total residuals is the sum of all the species with Mw of less than 500 Daltons in the HPLC traces.

TABLE 9

| Ex | Mol % NaPCP | ONa/Cl | Mw (Daltons) | Residuals (ppm) | Cl Ends |
|----|-------------|--------|--------------|-----------------|---------|
| 19 | 10.6 | 1.12 | 9184 | 1200 | <2000 |
| 20 | 15.3 | 1.15 | <7500 | >500 | <2000 |
| 21 | 8 | 1.02 | 28900 | <100 | <750 |
| 22 | 5.5 | 1.02 | 36524 | <100 | <750 |
| 23 | 5 | 1.02 | 39914 | <100 | 1400 |

The results in Table 9 show that when the amount of NaPCP was 5 mol % or more, the resulting polymer had a molecular weight that was at least 43,000.

Table 10 shows the endgroup composition of the final polymer.

TABLE 10

| Endgroup | Percent End group | | |
|----------|------|------|------|
| | Ex 21 | Ex 22 | Ex 23 |
| Chlorine | <10% | 12.5% | 25% |
| PCP | >70% | 62% | 48% |
| Hydroxyl | 20% | 24.5% | 26% |

The results in Table 10 show that the distributions of the end groups of the polymer can be varied, depending on the application. Articles molded from resins having such molecular weight have an unnotched Izod impact strength of less than 25 ft-lbs/in, when determined according to ASTM D4812 at 23° C., and a melt flow index of greater than 22 g/10 min when determined according to ASTM D1238, at 337° C./6.6 kg.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polyetherimide product comprising a polyetherimide composition comprising a reacted combination of alkali metal salts and a bis(halophthalimide):

(a) the combination of alkali metal salts comprising
an alkali metal salt of a dihydroxy aromatic compound having the formula

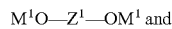

M$^1$O—Z$^1$—OM$^1$ and an alkali metal salt of a monohydroxy aromatic compound having the formula

M$^2$O—Z$^2$ wherein
M$^1$ and M$^2$ are each independently an alkali metal, and
Z$^1$ and Z$^2$ are each independently an aromatic C$_{6-24}$ monocyclic or polycyclic hydrocarbyl moiety optionally substituted with 1 to 6 C$_{1-8}$ alkyl groups, 1 to 8 halogen atoms, or a combination thereof, and
the alkali metal salt of the monohydroxy aromatic compound is included in an amount of greater than or equal to 5 mole percent, based on the total moles of the alkali metal salts; with (b) the bis(halophthalimide) of the formula

wherein R is selected from an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, an aromatic hydrocarbyl moiety having from 1 to 6 aromatic groups, and a divalent group having the formula

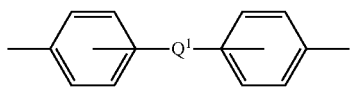

wherein $Q^1$ is selected from a direct bond, —O—, —S—, —C(O)—, —SO$_2$—, —SO—, —C$_y$H$_{2y}$— and a halogenated derivative thereof wherein y is an integer from 1 to 5, and —(C$_6$H$_{10}$)$_z$ wherein z is an integer from 1 to 4; and each X is independently selected from fluoro, chloro, bromo, and iodo; wherein the polyetherimide composition has a weight average molecular weight less than 43,000 Daltons and comprises structural units having the formula

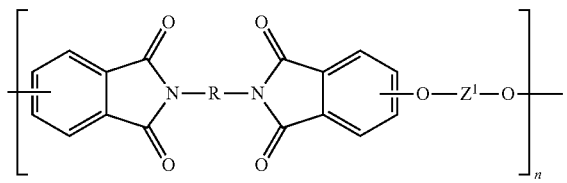

wherein n is greater than 1, and each R is the same or different, each $Z^1$ is the same or different, and are as defined above, wherein the polyetherimide composition has a plate-out weight of less than 1.1 mg, when determined using 200 shots from a 100° F. (37.8° C.) mold having the dimensions of 5×6×0.16 inches (12.7×15.2×0.4 cm); and wherein the polyetherimide composition comprises less than 350 ppm of residual bis(halophthalimide, based on the total weight of the polyetherimide composition.

2. The polyetherimide product of claim 1, wherein R is the aromatic hydrocarbyl moiety having from 1 to 6 aromatic groups and has the formula

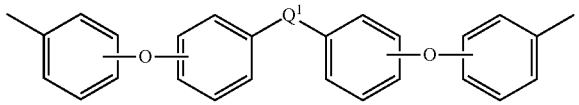

wherein $Q^1$ is selected from a direct bond, —O—, —S—, —C(O)—, —SO2—, —SO—, —C$_y$H$_{2y}$— and a halogenated derivative thereof wherein y is an Integer from 1 to 5, and —(C$_6$H$_{10}$)$_z$— wherein z is an integer from 1 to 4.

3. The polyetherimide product of claim 1, wherein the polyetherimide composition comprises from 0.5 to 4 weight percent of a monohydroxy aromatic compound substituent, based on the total weight of the polyetherimide composition.

4. The polyetherimide product of claim 1, wherein a total content of residual bis(halophthalimide) and residual bis(phthalimide) is less than 0.05 weight percent, based on the total weight of the polyetherimide composition.

5. The polyetherimide product of claim 1, wherein a content of chloride is less than 3000 ppm, based on the total weight of the polyetherimide composition.

6. The polyetherimide product of claim 1, wherein the polyetherimide composition has a plate out weight of less than 1.1 mg, when determined using 200 shots from a 350° F. (177° C.) Dynatup having the dimensions 4 inches (101.6 mm) in diameter and 0.125 inches (3.175 mm) thick.

7. The polyetherimide product of claim 1, wherein $M^1$ and $M^2$ are each sodium.

8. The polyetherimide product of claim 1, wherein $Z^1$ and $Z^2$ are each independently a $C_{12-24}$ polycyclic hydrocarbyl moiety optionally substituted with 1 to 6 $C_{1-8}$ alkyl groups.

9. The polyetherimide product of claim 1, wherein $Z^1$ is a divalent group having the formula

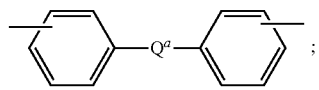

$Z^2$ is a monovalent group having the formula

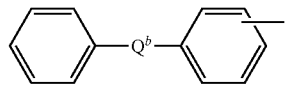

wherein $Q^a$ and $Q^b$ are each independently selected from a single bond, —O—, —S—, —C(O), —SO$_2$, —SO—, —C$_y$H$_{2y}$— and a halogenated derivative wherein y is an integer from 1 to 5, —(C$_6$H$_{10}$)—wherein z is an integer from 1 to 4; and R is selected from a divalent group having the formula

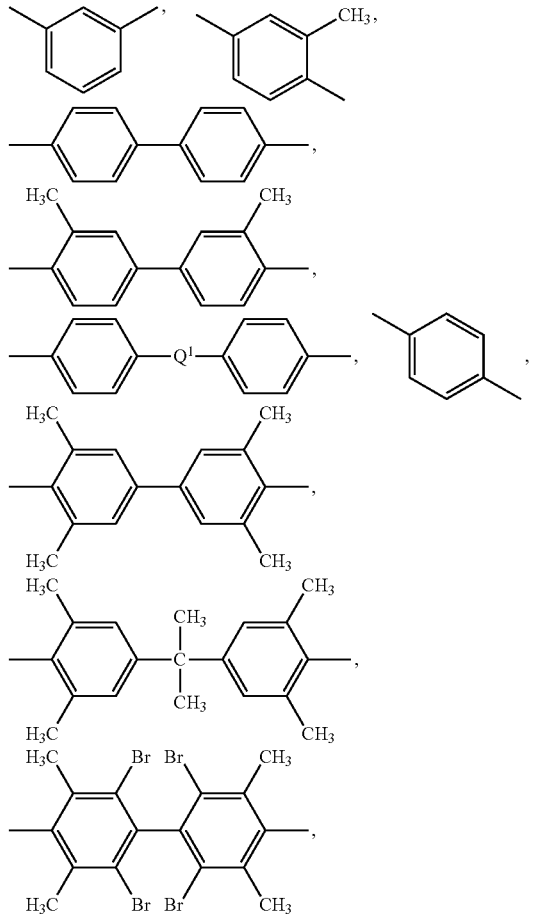

-continued

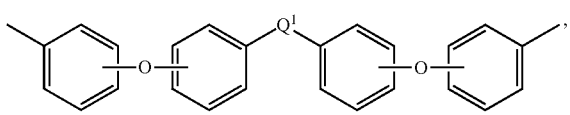

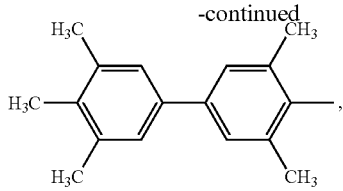

and a combination thereof, wherein $Q^1$ is selected from a single bond, —O—, —S—, —C(O)—, —SO$_2$-, —SO—, —C$_y$H$_{2y}$— and a halogenated derivative thereof wherein y is an integer from 1 to 5, and —(C$_6$H$_{10}$)$_z$— wherein z is an integer from 1 to 4.

10. The polyetherimide product of claim 1, wherein $Z^2$ is selected from

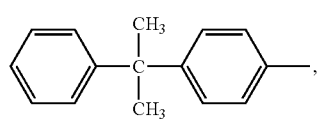

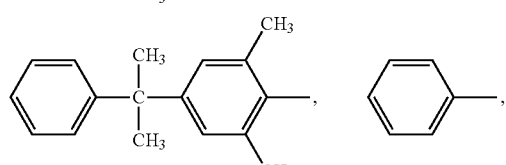 , 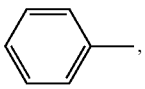 ,

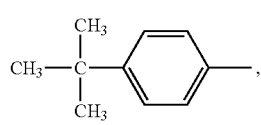

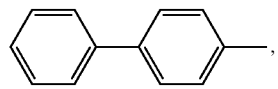

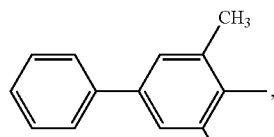

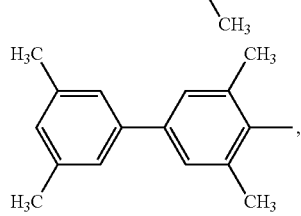

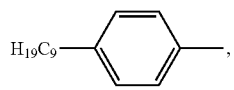

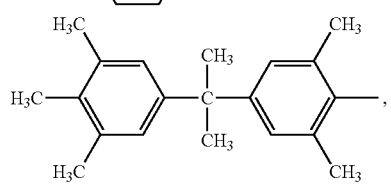

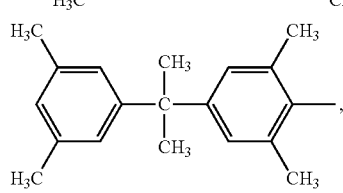

and a combination thereof.

11. The polyetherimide product of claim 1, wherein the alkali metal salt is selected from lithium salts, sodium salts, potassium salts, cesium salts, and a combination thereof.

12. The polyetherimide product of claim 1, wherein the alkali metal salt of the monohydroxy aromatic compound is the sodium salt of p-cumyl phenol.

13. The polyetherimide product of claim 1, wherein $Z^1$ is 2,2-(4-phenylene)isopropylidene and R is selected from m-phenylene, p-phenylene, diarylsulfone, and a combination thereof.

14. The polyetherimide product of claim 1, further comprising a filler.

15. The polyetherimide product of claim 1, wherein a filler is absent or substantially absent.

16. The polyetherimide product of claim 1, further comprising an additive selected from catalysts, impact modifiers, fillers, reinforcing agents, antioxidants, thermal stabilizers, light stabilizers, ultraviolet light (UV) absorbers, quenchers, plasticizers, lubricants, mold release agents, antistatic agents, colorants, blowing agents, flame retardants, anti-drip agents, reinforcing fillers, particulate fillers, nanofillers, radiation stabilizers, and a combination thereof.

17. The polyetherimide product of claim 16, further comprising an additive selected from an antioxidant, a UV absorber, a mold release agent, and a combination thereof.

18. The polyetherimide product of claim 17, wherein other additives are absent or substantially absent.

19. The polyetherimide product of claim 1, wherein an additive is absent or substantially absent.

20. The polyetherimide product of claim 1, wherein a molded sample of the polyetherimide composition has an unnotched Izod impact strength of greater than 25 ft-lbs/in, when determined according to ASTM 04812 at 23° C., and the polyetherimide composition has a melt flow index of less than or equal to 22 g/10 min, when determined according to ASTM 01238, at 337° C./6.6 kg.

21. A polyetherimide product comprising a polyetherimide composition comprising a reacted combination of alkali metal salts and a bis(chlorophthalimide):
 (a) the combination of alkali metal salts comprising
  an alkali metal salt bisphenol A, and
  an alkali metal salt of p-cumylphenol
 wherein the alkali metal salt of the p-cumylphenol is included in an amount of more than 0 and less than 5 mole percent, based on the total moles of the alkali metal salts; with
  (b) a bis(chlorophthalimide) of the formula

wherein R is selected from m-phenylene, p-phenylene, diarylsulfone, and a combination thereof; and wherein the polyetherimide composition has a weight average molecular weight less than 43,000 Daltons and comprises structural units having the formula

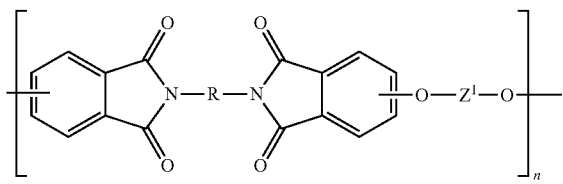

wherein n is greater than 1, and each R is as defined above, a molded sample of the polyetherimide composition has an unnotched Izod impact strength of less than 25 ft-lbs/in, when determined according to ASTM D4812 at 23° C., the polyetherimide composition has a total content of residual bis(halophthalimide) and residual bis(phthalimide) in the polyetherimide composition is less than 0.05 weight percent, based on the total weight of the polyetherimide composition, a total content of residual bis(chlorophthalimide) is less than 350 ppm, based on the total weight of the polyetherimide composition, and a content of chloride is less than 3000 ppm, based on the total weight of the polyetherimide composition.

22. A method for the manufacture of a polyetherimide composition of claim 1, the method comprising (a) contacting a halophthalic anhydride having the formula

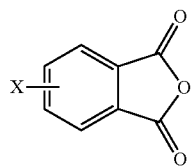

with an organic diamine having the formula

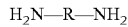

For form a bis(halophthalimide) having the formula

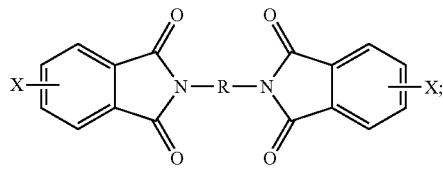

and (b) contacting the bis(halophthalimide) with a combination of alkali metal salts comprising an alkali metal salt of a dihydroxy aromatic compound having the formula

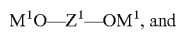

an alkali metal salt of a monohydroxy aromatic compound having the formula

wherein the alkali metal salt of the mono hydroxy aromatic compound is included in an amount of more than 0 and less than 5 mole percent, based on the total moles of the alkali metal salt of the dihydroxy aromatic compound and the alkali metal salt of the monohydroxy aromatic compound, to form the polyetherimide composition comprising structural units having the formula

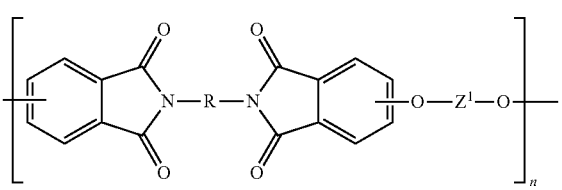

wherein in the forgoing formulas, n is greater than 1 each X is independently selected from fluoro, chloro, bromo, and iodo,

R is selected from an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, an aromatic hydrocarbyl moiety having from 1 to 6 aromatic groups, and a divalent group having the formula

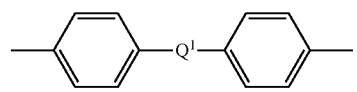

Wherein $Q^1$ is selected from a bond, —O—, —S—, —C(O)—, —SO2-, —SO—, —$C_yH_{2y}$— and a halogenated derivative thereof wherein y is an integer from 1 to 5, and —$(C_6H_{10})_z$— wherein z is an integer from 1 to 4; and $M^1$ and $M^2$ are each independently an alkali metal, and $Z^1$ and $Z^2$ are each independently an aromatic $C_{6-24}$ monocyclic or polycyclic hydrocarbyl moiety optionally substituted with 1 to 6 $C_{1-8}$ alkyl groups, 1 to 8 halogen atoms, or a combination thereof, and wherein the polyetherimide composition has a weight average molecular weight less than 43,000 Daltons, wherein the polyetherimide composition has a plate-out weight of less than 1.1 mg, when determined using 200 shots from a 100° F. (37.8° C.) mold having the dimensions of 5×6×0.16 inches (12.7×15.2×0.4 cm); and wherein the polyetherimide composition comprises less than 350 ppm of residual bis(halophthalimide, based on the total weight of the polyetherimide composition.

23. The method of claim 22, wherein the aromatic hydrocarbon moiety having from 1 to 6 aromatic groups has the formula:

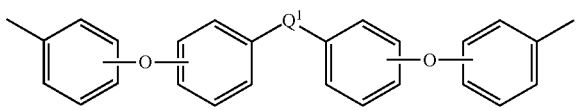

wherein $Q^1$ is selected from a direct bond, —O—, —S—, —C(O)—, —SO$_2$—, —SO—, —C$_y$H$_{2y}$— and a halogenated derivative thereof wherein y is an integer from 1 to 5, and —(C$_6$H$_{10}$)$_z$— wherein z is an integer from 1 to 4.

24. The method of claim 22, further comprising forming the polyetherimide composition at a pressure greater than atmospheric pressure.

25. The method of claim 22, wherein the polyetherimide composition comprises from 0.5 to 4 weight percent of a monohydroxy aromatic compound substituent, based on the total weight of the polyetherimide composition.

26. The method of claim 22, wherein a total content of residual bis(halophthalimide) and residual bis(phthalimide) is less than 0.05 weight percent, based on the total weight of the polyetherimide composition.

27. The method of claim 22, wherein a content of chloride is less than 3000 ppm, based on the total weight of the polyetherimide composition.

28. The method of claim 22, wherein
a molded sample of the polyetherimide composition has an unnotched Izod impact strength of greater than 25 ft-lbs/in, when determined according to ASTM 04812 at 23° C.; and
the polyetherimide composition has a melt flow index of less than or equal to 22 g/10 min, when determined according to ASTM 01238, at 337° C./6.6 kg.

29. The method of claim 22, wherein the polyetherimide composition has a plate-out weight of less than 1.1 mg, when determined using 200 shots from a 350° F. (177° C.) Dynatup having the dimensions 4 inches (101.6 mm) in diameter and 0.125 inches (3.175 mm) thick.

30. The method of claim 22, wherein $M^1$ and $M^2$ are each sodium.

31. The method of claim 22, wherein $Z^1$ and $Z^2$ are each independently a $C_{12-24}$ polycyclic hydrocarbyl moiety optionally substituted with 1 to 6 $C_{1-8}$ alkyl groups.

32. The method of claim 22, wherein
$Z^1$ is a divalent group having the formula

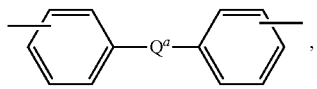

and
$Z^2$ is a monovalent group having formula

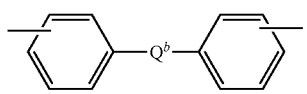

wherein $Q^a$ and $Q^b$ are each independently selected from a single bond, —O—, —S—, —C(O)—, —SO$_2$—, —SO—, and —C$_y$H$_{2y}$— and a halogenated derivative thereof wherein y is an integer from 1 to 5, and R is selected from a divalent group of the formula

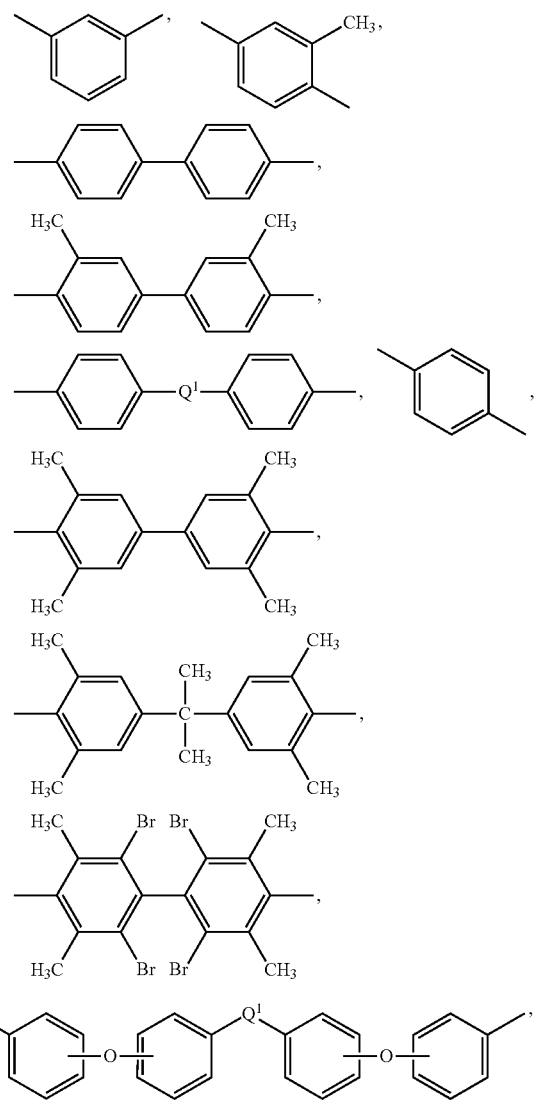

and a combination thereof, wherein $Q^1$ is selected from a single bond, —O—, —S—, —C(O)—, —SO$_2$—, —SO—, —C$_y$H$_{2y}$— and a halogenated derivative thereof wherein y is an integer from 1 to 5, and —(C$_6$H$_{10}$)$_z$— wherein z is an integer from 1 to 4.

33. The method of claim 22, wherein $Z^2$ is selected from

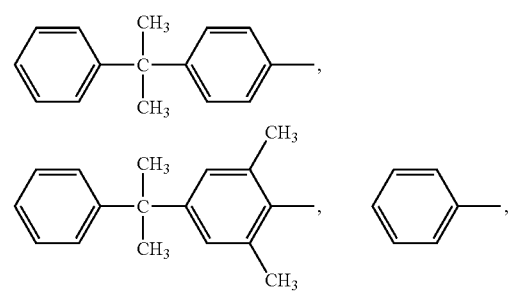

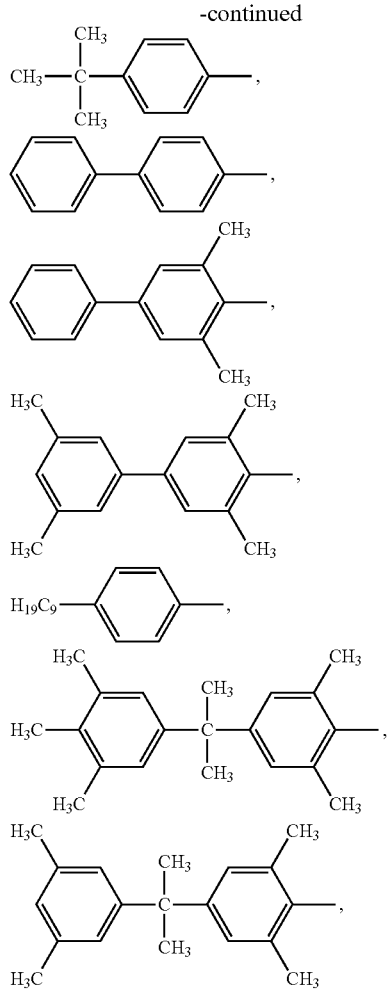

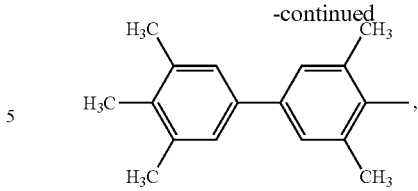

and a combination thereof.

34. The method of claim 22, wherein the alkali metal salt is selected from lithium salts, sodium salts, potassium salts, and cesium salts.

35. The method of claim 22, wherein the alkali metal salt of the monohydroxy aromatic compound is the sodium salt of p-cumyl phenol.

36. The method of claim 22, wherein $Z^1$ is 2,2-(4-phenylene)isopropylidene and R is selected from m-phenylene, p-phenylene diarylsulfone, and a combination thereof.

37. An article comprising the polyetherimide product of claim 1.

38. The article of claim 37, selected from a sheet, film, multilayer sheet, multilayer film, molded part, extruded profile, coated part, and fiber.

39. The article of claim 38, wherein the sheet is selected from a foam sheet, paper sheet, and fabric sheet.

40. The article of claim 38, wherein the article is a molded part having a thickness from 1 to 5 millimeters.

41. A method of forming an article, comprising shaping, extruding, molding, spinning, or thermoforming the polyetherimide product of claim 1 to form the article.

42. The method of claim 41, wherein the method forms fibers, and the method further comprising weaving or entangling the fibers to form a fabric.

43. A varnish comprising the polyetherimide product of claim 1 and a varnish solvent.

44. A powder coating comprising the polyetherimide product of claim 1 and a coating powder.

* * * * *